(12) United States Patent
Salada

(10) Patent No.: US 11,990,026 B2
(45) Date of Patent: May 21, 2024

(54) TECHNIQUES FOR HAPTICS COMMUNICATION

(71) Applicant: DISTAL REALITY LLC, Denver, CO (US)

(72) Inventor: Mark A. Salada, Denver, CO (US)

(73) Assignee: INFINITE SET TECHNOLOGY, INC., Wilmington, DE (US)

( * ) Notice: Subject to any disclaimer, the term of this patent is extended or adjusted under 35 U.S.C. 154(b) by 28 days.

(21) Appl. No.: 17/852,141

(22) Filed: Jun. 28, 2022

(65) Prior Publication Data

US 2022/0415143 A1 Dec. 29, 2022

Related U.S. Application Data

(60) Provisional application No. 63/215,907, filed on Jun. 28, 2021.

(51) Int. Cl.
*G08B 6/00* (2006.01)

(52) U.S. Cl.
CPC ................................ *G08B 6/00* (2013.01)

(58) Field of Classification Search
CPC ...................................................... G08B 6/00
USPC ...................................................... 340/407.2
See application file for complete search history.

(56) References Cited

U.S. PATENT DOCUMENTS

| | | | |
|---|---|---|---|
| 9,229,535 B2 | 1/2016 | Vice et al. | |
| 9,400,555 B2 | 7/2016 | Quigley et al. | |
| 10,396,905 B2 | 8/2019 | Tyler et al. | |
| 10,514,763 B2 | 12/2019 | Yamano et al. | |
| 10,591,996 B1 | 3/2020 | Knott et al. | |
| 10,653,202 B2 | 5/2020 | Destrian et al. | |
| 11,430,467 B1 * | 8/2022 | Vasudevan et al. | .... G10L 25/63 |
| 2013/0227411 A1 | 8/2013 | Das et al. | |
| 2016/0018890 A1 | 1/2016 | Deokar et al. | |
| 2017/0134567 A1 | 5/2017 | Jeon et al. | |

(Continued)

FOREIGN PATENT DOCUMENTS

KR       10-0471669 B1      3/2005
KR    10-2014-0004510 A     1/2014

OTHER PUBLICATIONS

"International Search Report and Written Opinion of the International Searching Authority," issued in connection with Int'l Appl. No. PCT/US2022/035311, dated Oct. 17, 2022 (10 pages).

(Continued)

*Primary Examiner* — Jack K Wang
(74) *Attorney, Agent, or Firm* — Holland & Hart LLP

(57) ABSTRACT

Methods, systems, and devices for haptics communication are described. In some examples, a method may be performed by a device. The method may include detecting an indication to create a haptic message. The method may also include displaying a field for entering sentiment information based at least in part on the detecting the indication. The method may also include displaying a plurality of haptic indicators for selection, the plurality of haptic indicators associated with the sentiment information. The method may also include obtaining one or more selected haptic indicators from the plurality of haptic indicators. Additionally, the method may include generating the haptic message as an association between the sentiment information and the one or more selected haptic indicators.

22 Claims, 19 Drawing Sheets

(56) References Cited

U.S. PATENT DOCUMENTS

| | | | |
|---|---|---|---|
| 2017/0348583 A1* | 12/2017 | Darmour | G06V 40/23 |
| 2018/0021099 A1* | 1/2018 | Warner | G06F 3/016 |
| | | | 604/95.01 |
| 2018/0260029 A1 | 9/2018 | Birnbaum et al. | |
| 2019/0129608 A1 | 5/2019 | Kim et al. | |
| 2019/0228619 A1* | 7/2019 | Yokoyama | G06F 13/00 |
| 2020/0142484 A1* | 5/2020 | Maalouf | G06F 3/013 |
| 2020/0302952 A1* | 9/2020 | Pinkus et al. | G10L 25/63 |
| 2020/0320608 A1* | 10/2020 | Handy Bosma et al. | |
| | | | G06Q 30/0631 |
| 2020/0371593 A1 | 11/2020 | Araújo et al. | |
| 2021/0166267 A1* | 6/2021 | Moskowitz | G06Q 30/0255 |
| 2021/0169389 A1* | 6/2021 | Moskowitz | A61B 5/28 |
| 2022/0057864 A1* | 2/2022 | Ito | A63F 13/28 |

OTHER PUBLICATIONS

Aijaz, A., et al., "Realizing the Tactile Internet: Haptic Communications over Next Generation 5G Cellular Networks", IEEE, 2016.
Teh, J.K.S., et al., "Huggy Pajama: a mobile parent and child hugging communication system", Proceedings, 2008, pp. 250-257.

\* cited by examiner

TECHNIQUES FOR HAPTICS COMMUNICATION

CROSS REFERENCE TO RELATED APPLICATIONS

This application claims priority to and the benefit of U.S. Provisional Patent Application No. 63/215,907, entitled "Techniques for Haptics Communication," filed Jun. 28, 2021, the disclosure of which is hereby incorporated by reference in its entirety.

FIELD OF TECHNOLOGY

The following relates to improved techniques for haptics communication.

BACKGROUND

Conventional messaging systems generally utilize a vibration with a sound executed by a device as a notification to a user that a message has arrived for viewing on the display screen by the user. When the device is operating in a silent mode, a vibration without a sound may be executed by the device to notify the user that the message has arrived for viewing on the display screen by the user. The limited role of merely notifying a recipient that a message is available underutilizes the vast capabilities that a vibration can convey to a user. Furthermore, vibrations are but one of the many physical sensations that a user can sense and discriminate when holding or wearing an electronic device with such capabilities.

The present disclosure addresses the untapped capabilities of displaying physical sensations to a user when interacting through and with existing and future electronic (or "smart") devices, existing and future wearable devices, and in particular establishes a new paradigm for associating personal expression with physical sensations over a digital communication network.

SUMMARY

The described techniques relate to improved methods, systems, devices, and apparatuses that support techniques for haptics communication.

Among other inventive aspects disclosed herein, the present disclosure introduces a vring (a haptic message) as the association of a sentiment with a physical sensation such that the sentiment can be expressed between and among individuals, as well as between individuals and the smart electronics and appliances in the environment around them through touch alone. No need to look at, hear, or interact with a screen.

Among other inventive aspects disclosed herein, the present disclosure introduces the wireless exchange of vrings among users (human or not) as a network coined by the inventor as the 'Haptics of Things,' or 'HoT.' Users may exchange vrings between devices one to one, or may broadcast one to many.

Among other inventive aspects disclosed herein, the present disclosure introduces the "inverse broadcast," wherein the network aggregates a multiplicity of users' vrings into a singular vring for a singular recipient. A recipient with a device capable of displaying physical sensations receives a pattern that is the aggregation of a multiplicity of similarly capable devices based on an algorithm hosted on an intermediary server which is also part of the network.

DETAILED DESCRIPTION

Figure 1:
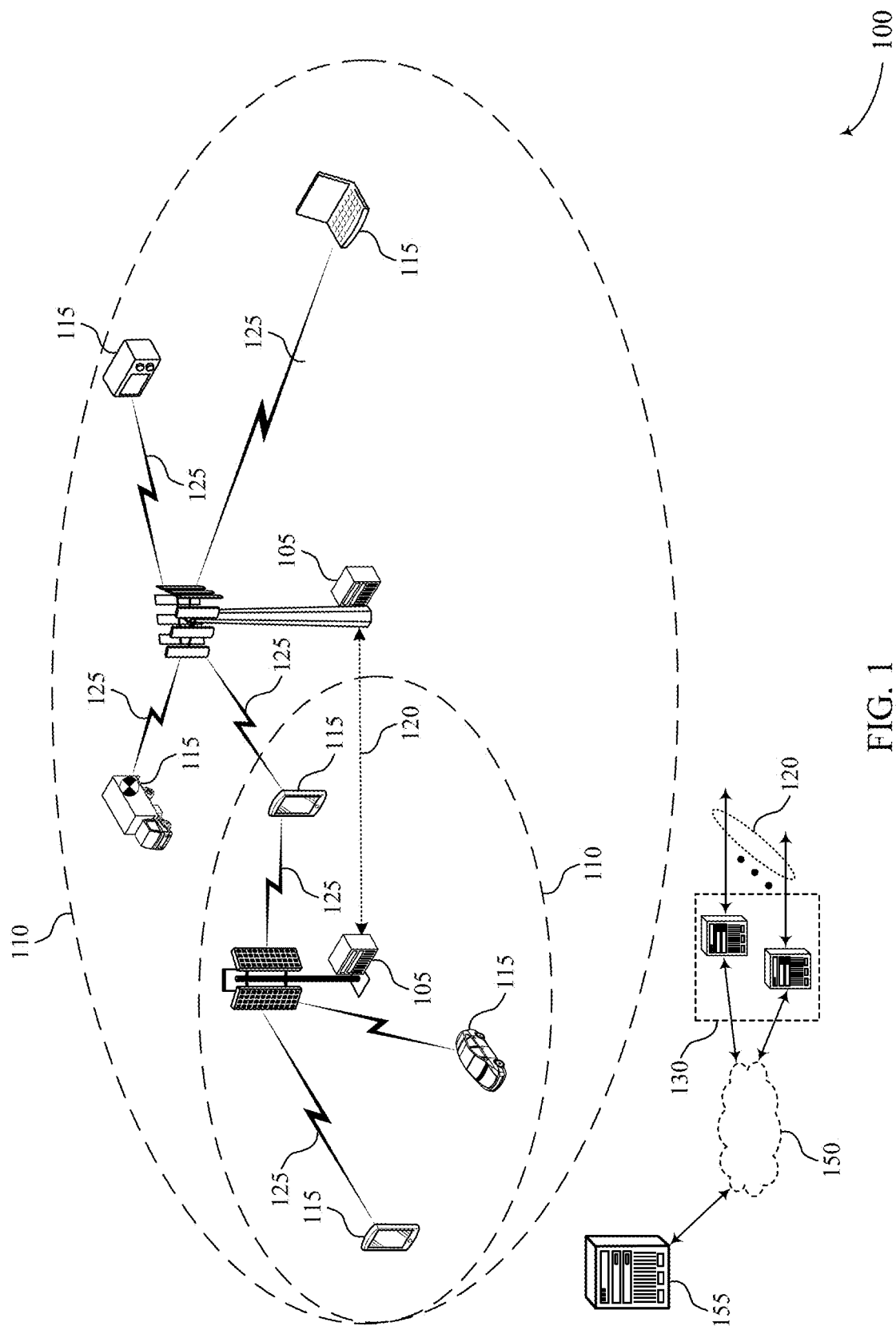
FIG. 1 illustrates an example of a wireless communications system that supports techniques for haptics communication in accordance with aspects of the present disclosure.

Mobile devices connect users through phone, video, and text messages. A missing essential aspect of human interaction of mobile devices is the sense of touch. Physical, or haptic, interaction through the internet is currently exclusive to specialty devices with limited one-to-one connections, at best. The present invention takes a step towards adding physical interactions to all smart devices on the internet by first introducing the concept of a haptic message, called a vring, and further defining the network with which vrings are exchanged among users on the internet.

The vring network, called the Haptics of Things, allows for one-to-one and broadcast (one-to-many) interactions as well as introducing an "inverse broadcast," where multiple users' haptic messages are amalgamated into a singular physical message for a single user, a many-to-one novelty.

A many-to-one novelty device may generate a digital message (vring) and transmit the digital message for haptic communication with another device. The digital message may be designed by the user or other automated means, to associate a sentiment with a spatiotemporal pattern of physical or haptic sensations. A sentiment may be, but is not limited to, any communicable linguistic word, phrase, idiom, saying, exclamation, allegory, feeling, metaphor, inference, inuendo, intent, spirit of intent, meaning, expression, statement, announcement, slang, joke, witticism, quote, abbreviation, acronym, hyperbole, or any form of figurative language, logogram in the form of a Hanzi, Kanji, Han, or Hangul character, or image of such sentiment in the form of an emoji, meme, pictogram, or image. In some embodiments, a sentiment may be linguistic phonemes or commands.

In some aspects, the digital message may include at least two parts: a haptic handle and a haptic message. The haptic handle may correspond to a pattern of physical or haptic sensations that may uniquely identify an originator of the digital message. The haptic message may correspond to a pattern of physical or haptic sensations that represents the sentiment (e.g., the phrase or expression intended to be conveyed in a haptic manner by the originator). In some cases, the haptic message may include one or more successive parts (e.g., a plurality of haptic rudiments). In some cases, the digital message may include a plurality of haptic messages (e.g., haptic message (1), . . . haptic message (N). The two parts of the digital message may be physically displayed to the recipient or recipients in sequence, out of sequence, concurrently, or as a convolution of the two.

In some implementations, the haptic handle and haptic message may be packaged together with metadata. The metadata may include information related to the sentiment and or to the haptic pattern as well as other information associated with delivery of the digital message. In some aspect, the pattern of physical or haptic sensations for the haptic handle and haptic messages may be arbitrary and user-specified or may be algorithmically generated from the sentiment. For example, each of the haptic handle and haptic message may be selected from a set of haptic rudiments and time delays. In some cases, timing indicators may include but are not limited to a pre-defined time delay (quarter-second, full second, etc.), time loops for repeating part or all of a given combination, and or time synchronization elements such as "upon completion of prior pattern," or "concurrent with another pattern." In some cases, the haptic rudiments may be singular, pre-defined haptic sensations based on a device's actuator capability. Similarly, the sentiment associated to a haptic message may be arbitrary and user-specified.

A device may receive a digital message from another device. Upon reception of the digital message, the haptic handle and haptic message may be actuated by the device. In some cases, the haptic handle may be actuated first (e.g., to identify the originator) and the haptic message may be actuated by the device following the haptic handle. In some cases, the haptic handle and the haptic message may be actuated concurrently, for example when the device includes multiple haptic actuators and is capable of supporting concurrent or overlapping haptic actuation. In yet other cases, the haptic message may be actuated first (e.g., to immediately convey the sentiment) and the haptic handle may be actuated by the device following the haptic message. In some aspect, the haptic handle and haptic message may be conditionally actuated based on the digital message by the device (e.g., based on information in the metadata of the digital message).

Information in the metadata used to conditionally actuate the haptic handle and haptic message may include, but is not limited to: geographic location of the sender and/or recipient; motion, position, and or the orientation of the recipient's device; battery charge state of the recipient's device, temperature of the recipient's device, proximity of the recipient's device to the recipient's head or other body part; proximity of the recipient's device to another user's mobile device; proximity of the recipient's device to an external sensor; a locked/unlocked state of the recipient's device; content of an image or video produced by the recipient's device camera, conditional to the reception of a separate digital message, an absolute time, or relative time with respect to the sender's issue timestamp, or delay; or any combination thereof.

In some aspect, a digital message may be transmitted from a user's device to another user's device for communication including, but not limited to personal expression. For example, users may exchange haptic messages to express or indicate "I love you," "I got home safe," "I'm leaving work now," etc. In some aspects, a digital message may transmitted from an entity such as, but not limited to a smart appliance, smart hub, smart home device, or other IoT device, etc., to a user's device to express a state or condition of a device or article associated with the transmitting entity. For example, a smart appliance may transmit haptic messages to express or indicate "a door is ajar," "spoiled food detected," "heating element remains on," etc.

In some implementations, a communications system or network for exchanging haptic messages may include devices of multiple types operatively coupled or connected by a server. The server may provide independent exchange of the digital messages between devices as described herein. The server can identify a location of the devices within the communications system or network. For example, the devices may be designated by a telephone number, an interne address (URL), or a MAC address, which may be known by the server. The server may relay digital messages from one device to another and/or facilitate the delivery of digital messages from one device to multiple devices simultaneously on the communications system or network. In some cases, the server may employ an algorithm to track exchanges of digital messages. Additionally or alternatively, the server may measure which digital messages are exchanged frequently. In some implementations, the results the measurement and other information related to the exchange of digital messages may be made available for display (e.g., on a website or an application).

Aspects of the subject technology may also include inverse broadcast of haptics communication. In some implementations, the server may receive multiple digital messages from multiple devices. Each of the multiple digital messages may be intended for a single recipient device. The server may aggregate (e.g., mathematically or algorithmically) the multiple digital messages to generate an aggregated digital message for the single recipient device. In some examples, the algorithm implemented by the server may average, compress, reduce, convolve, sum, or otherwise mathematically manipulate the multiple incoming digital messages. In some cases, the metadata associated with the multiple digital messages may be utilized in the aggregation process. The server may transmit the aggregated digital message to the single recipient device.

Aspects of the disclosure are initially described in the context of a wireless communications system and communication system. Aspects of the disclosure are further illustrated by and described with reference to apparatus diagrams, system diagrams, and flowcharts that relate to techniques for haptics communication.

FIG. 1 illustrates an example of a wireless communications system 100 that supports techniques for haptics communication in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, a personal computer, a watch or smart watch, a game controller, a key FOB, or a remote control. In some examples, a UE 115 may include or be referred to as a wireless local loop (WLL) station, an Internet of Things (IoT) device, an Internet of Everything (IoE) device, a machine type communications (MTC) device, or a Haptics of Things (HoT) among other examples, which may be implemented in various objects such as appliances, or vehicles, meters, etc.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)).

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115, such as MTC, IoT devices, or HoT devices may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, equipment monitoring, remote security sensing, physical access control, etc.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service. For example, haptics application server 155 may be operatively coupled to UEs 115 via IP services 150.

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ LTE or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance.

In accordance with aspects of the subject technology, the wireless communications system 100 may support UEs 115 and a haptics application server 155 implementing the various techniques for haptics communication discussed herein. In some aspects, a user may desire to create a haptic message on a device, such as a UE 115. The UE 115 may detect an indication by user input to create the haptic message. The UE 115 may display a field for entering sentiment information based at least in part on the detecting the indication. The user may enter sentiment information in the form of text or images (e.g., emoticons, images of facial expressions, or memes) corresponding to the haptic message being created. The UE 115 may display a plurality of haptic indicators for selection. In some embodiments, the UE 115 may display timing indicators for selection. The plurality of haptic indicators and timing indicators may be associated with the sentiment information.

The user may review and select one or more haptic indicators (e.g., each haptic indicator indicating a particular haptic rudiment). The UE 115 may obtain one or more selected haptic indicators from the plurality of haptic indicators. In some embodiments, the UE 115 may obtain one or more selected timing indicators from the plurality of timing indicators The UE 115 may generate a haptic message as an association between the sentiment information and the one or more selected haptic indicators. In some embodiments, the UE 115 may generate the haptic message as an association between the sentiment information and timing indicators, or between any combination of timing and haptic indicators. The user may utilize haptic message for transmission via the UE 115 to one or more contacts.

In some aspects, a user may desire to assign a haptic modifier to a haptic handle (e.g., when the user's contacts include two or more contacts with similar haptic handles) on a device, such as a UE 115. The UE 115 may detect an indication to assign the haptic modifier to the haptic handle. The UE 115 may display one or more contact indicators to select for assigning the haptic modifier based at least in part on the detecting the indication. The user may review and select a contact from the one or more contact indicators to which the haptic modifier should be added. The UE 115 may obtain a selected recipient indicator from the one or more recipient indicators. The UE 115 may display a plurality of haptic indicators for selection as the haptic modifier. The user may review and select one or more haptic indicators. The UE 115 may obtain one or more selected haptic indicators from the plurality of haptic indicators for the haptic modifier. The UE 115 may assign the haptic modifier to the selected contact indicator. When the user receives, via the UE 115, a haptic message from a contact, the assigned haptic modifier can be appended to the contact's haptic handle. In this manner, the user may more readily identify the contact from which the haptic message is being sent.

In some aspects, a user may desire to transmit a haptic message to a contact (e.g., the contact may be associated with a receiving entity to receive the haptic message) via a device, such as a UE 115. The UE 115 may obtain sentiment information to be communicated to a second device associated with a receiving entity. The UE 115 may determine first haptic information corresponding to a transmitting entity (e.g., a haptic handle associated with the user originating the transmission) and second haptic information corresponding to the sentiment information. The UE 115 may format a digital message for transmission to the second device to include the first haptic information and the second haptic information. In some cases, the UE 115 may format the digital message with metadata. The UE 115 may transmit the digital message to the second device associated with the receiving entity. In some cases, the UE 115 may transmit the digital message to the second device via a haptics application server 155. That is, the UE 115 may transmit the digital message to the haptics application server 155, and the haptics application server 155 may transmit or forward the digital message to the second device. In some cases, the second device may also be a UE 115. In this manner, sentiment information, which may include expressions not effectively or efficiently communicated via visual or audible means may be transmitted and received.

In some aspects, a user may receive a haptic message from a contact (e.g, the contact may be associated with a transmitting entity of the haptic message) via a device, such as a UE 115. The UE 115 may receive, from a first device associated with a transmitting entity, a digital message. The UE 115 may determine, based at least in part on a format of the digital message, first haptic information corresponding to the transmitting entity (e.g., a haptic handle associated with the contact that is originating the transmission) and second haptic information corresponding to sentiment information (e.g., sentiment information intending to be conveyed by the transmitting entity to the user as the recipient). The UE 115 may initiate a first haptic rudiment associated with the first haptic information and a second haptic rudiment associated with the second haptic information using one or more haptic actuators of the UE 115. In some cases, the UE 115 may receive the digital message from the first device via a haptics application server 155. That is, the haptics application server 155 may receive the digital message from the first device, and the haptics application server 155 may transmit or forward the digital message to the UE 115, which may receive the forwarded digital message. In some cases, the first device may also be a UE 115. Similarly, in this manner, sentiment information may be sent and received such that no visual or verbal communication is required for receiving and comprehending the sentiment information being transmitted.

In some aspects, multiple users may desire to transmit haptic messages via devices, such as first UEs 115 to a single device, such as a second UE 115 associated with a receiving entity (e.g., a single user). For example, a haptics application server 155 may receive, from the first UEs 115 associated with a plurality of transmitting entities, a plurality of digital messages. In some cases, each of the plurality of digital messages may comprise sentiment information to be communicated to the second UE 115 associated with the receiving entity. The haptics application server 155 may determine, for each of the plurality of digital messages, a first haptic information corresponding to a transmitting entity of the plurality of transmitting entities and second haptic information corresponding to the sentiment information. The haptics application server 155 may identify a pattern associated with aggregated sentiment information from the plurality of digital messages. The haptics application server 155 may format a second digital message for transmission to the second UE 115 to include third haptic information corresponding to the aggregated sentiment information. The haptics application server 155 may transmit the second digital message to the second UE 115 associated with the receiving entity. In this manner, sentiment information may be effectively or efficiently communicated, for example, where visual or audible means may not be practical to communicate the sentiment information being transmitted.

Figure 2:
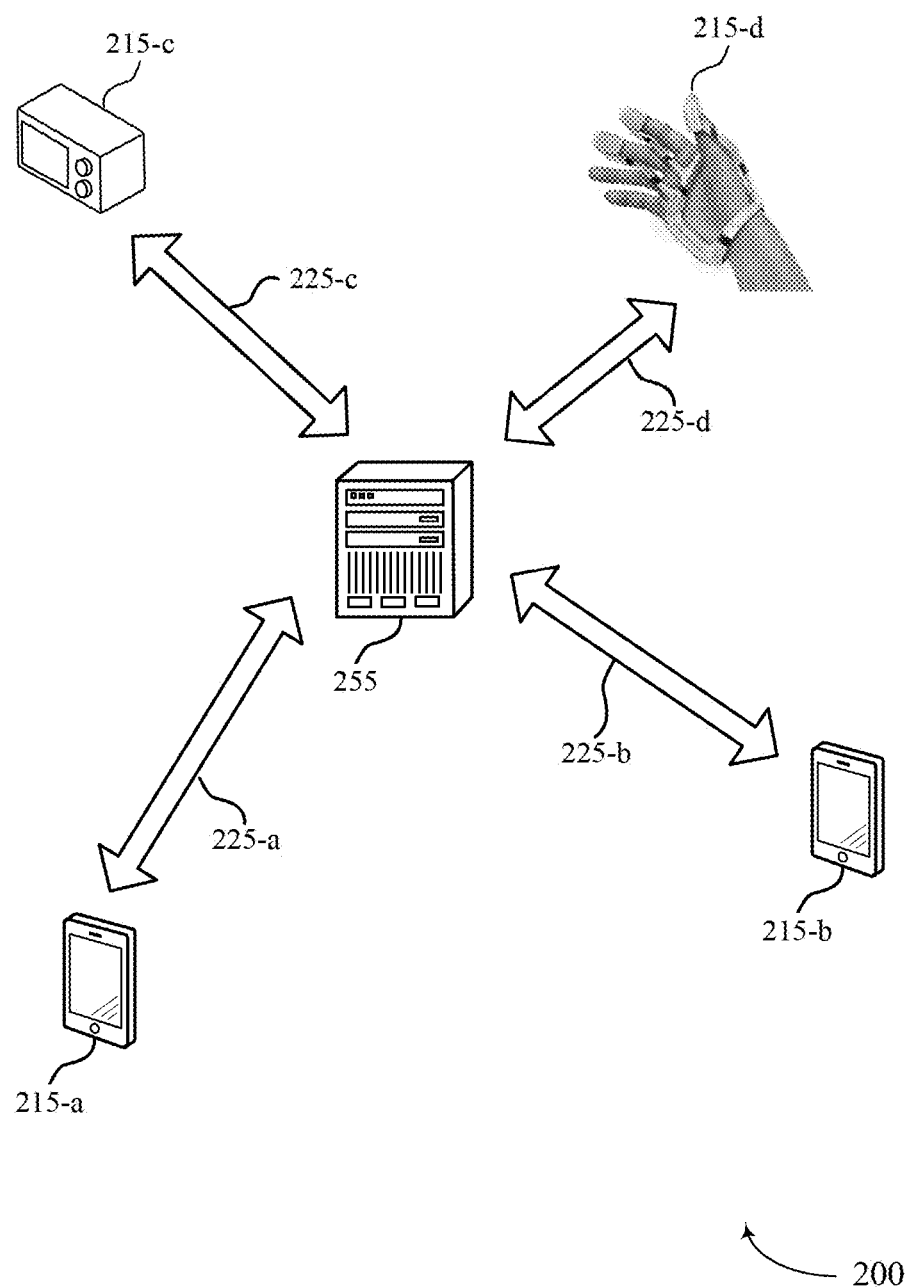
FIG. 2 illustrates an example of a communications system that supports techniques for haptics communication in accordance with aspects of the present disclosure.

FIG. 2 illustrates an example of a communications system 200 that supports techniques for haptics communication in accordance with aspects of the present disclosure. In some implementations, the communications system 200 may be a system operable in a cloud computing environment. The communications system 200, which may be an example of a system for data processing, includes devices 210 and haptics application server 255. The communications system 200 may implement aspects of and be operable with the wireless communications system 100 as described with reference to FIG. 1. For example, haptics application server 255 may be examples or components of haptics application server 155. Devices 215 may be examples or components of UEs 115. Each of devices 215 may communicate with other devices via base stations 105. For example, haptics application server 255 may communicate with each of devices 215 via an interaction 225 that may include communication via IP services 150, core network 130, backhaul links 120, base stations 105, and one or more communication links 125 as described with reference to FIG. 1. Interactions 225 may include one-way or two-way communication. Data including information associated with haptic communication may be associated with the interactions 225.

Figure 3:
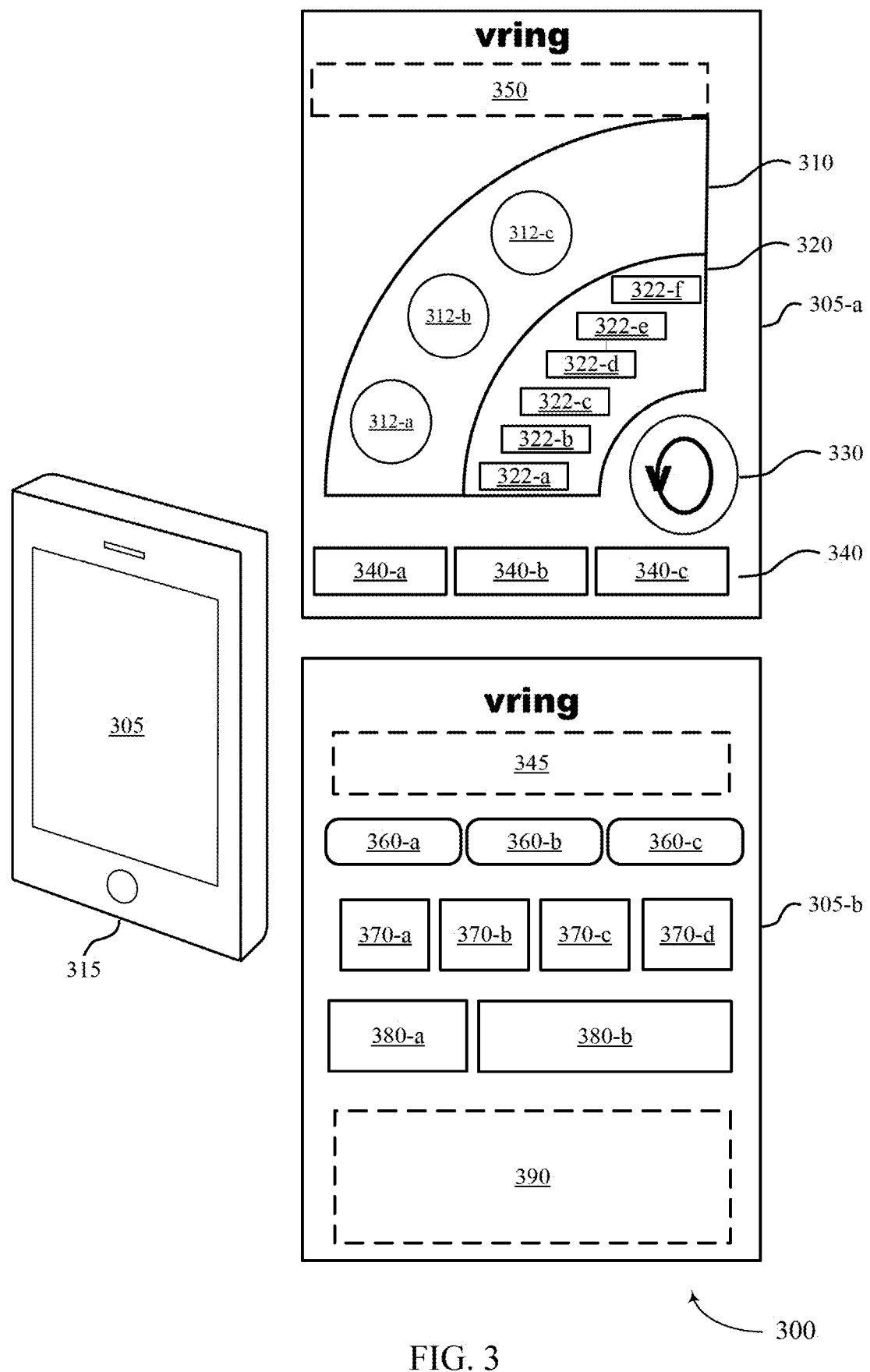
FIG. 3 illustrates an example of a haptics application operable on a device that supports techniques for haptics communication in accordance with aspects of the present disclosure.

FIG. 3 illustrates an example of a haptics application 300 operable on a device 315 that supports techniques for haptics communication in accordance with aspects of the present disclosure. In some cases, device 315 may be an example of aspects of a device 215 or a UE 115 as described herein. In some implementations, device 315 may operate haptics application 300 in a system that includes aspects of the wireless communications system 100, the communications system 200, or both, as described herein with reference to FIGS. 1 and 2.

Device 315 may have a screen (e.g., a touch screen) to effectuate a display screen 305 for user interaction. In some implementations, display screen 305-a may include a first selectable portion 310, a second selectable portion 320, a third selectable portion 230, and a fourth selectable portion 340. The first selectable portion 310 may include one or more contact indicators 312. The contact indicators 312 may identify receiving entities to whom a user of the haptics application 300 may send haptic messages. The contact indicators 312 may identify transmitting entities from whom the user of the haptics application 300 may receive haptic messages. For example, the haptics application 300 may include contact indicators 312-a, 312-b, 312-c that correspond to entities in a user's contacts or address book. For example, contact indicators 312-a, 312-b, 312-c can be phone numbers, emails addresses, or the like. In some aspects, each of the contact indicators 312-a, 312-b, 312-c can correspond to a plurality of address identifiers for a same contact. For example, contact indicator 312-b can correspond to a phone number associated with a user device of a contact and an email address associated with an email account of the contact. In some cases, each of the contact indicators 312-a, 312-b, 312-c can correspond to a plurality of contacts. For example, contact indicator 312-c can correspond to a first phone number associated with a first contact user device, a second phone number associated with a second contact user device, and a third phone number associated with a third contact user device.

The second selectable portion 320 may include one or more haptic indicators 322. For example, the haptics application 300 may include haptic indicators 322-a, 322-b, 322-c, 322-d, 322-e, 322-f, that correspond to haptic rudiments or predefined haptic messages. In some non-limiting examples, the haptic rudiments identified by the one or more haptic indicators 322 include vibration patterns that produce a buzz, tock, tick, hit, hum, etc. Such sensations may be localized on one or more areas of a user's body. For example, specifying a finger or thumb tip, or instead directing sensations to the whole finger or hand as in the pressure sensation from wearing a glove. All contact locations with the hand are candidate locations to deliver haptic sensations, but also included are contact locations from other wearable devices such as smart watches (the wrists and arms), the soles of the feet and toes from smart foot apparel, or the back and neck from haptic vests. These and any other area in contact with a device that can deliver haptic sensations may be sequenced or triggered, concurrently or in series by a vring message.

In some implementations, the one or more haptic indicators 322 may include forced or guided movements by haptic actuators (e.g., forced or guided movements such that the fingers in a hand controller are formed to a shape or pose). Additionally, haptic rudiments may be associated with various haptic sensations, such as but not limited to: pressure, thermal conductivity, skin stretch, skin orientation (e.g., basically a tilted flat shape), wetness, tickle, or pain. A haptic message may include an assembly of one or more haptic rudiments. That is, a haptic message may include a haptic rudiment alone, or a first rudiment then followed in time by a second haptic rudiment (e.g., a series of successive haptic rudiments). A haptic message may include a first haptic rudiment overlapping in time with a second haptic rudiment (e.g., concurrent haptic rudiments). A haptic message may include a haptic rudiment overlapping in time with a second haptic rudiment followed in time by a third haptic rudiment, and so on. The number of concurrent rudiments is limited only by the capability of the haptic display device. Furthermore, a haptic message may include a different and complete haptic message as a rudiment, i.e., nested and recursive rudiment may be combined with other rudiments.

In some aspects, the third selectable portion at 330 may include a haptic delivery indicator. For example, a user may select contact indicator 312-*a*, select haptic indicator 322-*e*, and select haptic delivery indicator 330 to initiate transmission. Haptic indicator 322-*e* may be associated with a haptic message that will be sent to a recipient device associated with contact information indicated by contact indicator 312-*a*. For example, a user may select contact indicator 312-*a* (e.g., indicating contact information for Mom), select haptic indicator 322-*e* a haptic message (e.g., indicating a haptic message for "I made it home safely") that will be sent to a recipient device associated with contact information (e.g., a phone number for contact Mom) indicated by contact indicator 312-*a*, and select haptic delivery indicator 330 (e.g., to transmit a digital message to Mom that include with the user's haptic handle and the haptic message). The recipient device may be located in a pocket of the recipient or otherwise positioned to impart haptic sensations, thereby allowing the recipient to receive and understand the haptic message without looking at or otherwise accessing the recipient device.

In some aspects, at 305-*b* a display screen may be designed for users to create a custom haptic message. The screen may include an entry field for the sentiment 345, a scrollable selection of haptic rudiments at 360-*a*, 360-*b*, and 360-*c*, a scrollable selection of time delays at 370-*a*, 370-*b*, 370-*c*, and 370-*d*, a scrollable selection of previously created haptic messages at 380-*a* and 380-*b*, wherein upon selection each rudiment, time delay, and or existing custom message is placed and displayed in sequence on a timeline or multiplicity of timelines at 390. Additionally, at 390 additional metrics related to the newly created vring may be displayed such as estimated battery consumption, estimated perception metrics, and other pertinent information. For example, a user may in sequence select 360-*b* "Hum," select 370-*c* "Pause," select 360-*b* "Hum" again, select 370-*c* "Pause" again, and finally select 360-*a* "Hit," which is then displayed on a line at 390 as "Hum—Pause—Hum—Pause—Hit," the sequence of rudiments that comprise the message, and finally enter text "I made it home safely" at 345 to associate the sequence of rudiments with the sentiment, and thus create the haptic message.

In some aspects, a haptic message may be designed to communicate sentiment information. In some cases, sentiment information can be name a single word, a plurality of words, or a phrase associated with the haptic message. In some cases, a haptic message can be assigned absent any words. For example, a sentiment information can include an emoji, or an image, or a meme, etc., absent any text describing the sentiment. In some cases, the sentiment information field 345 may enable entry of text or may enable selection or uploading of an image.

Figure 4:
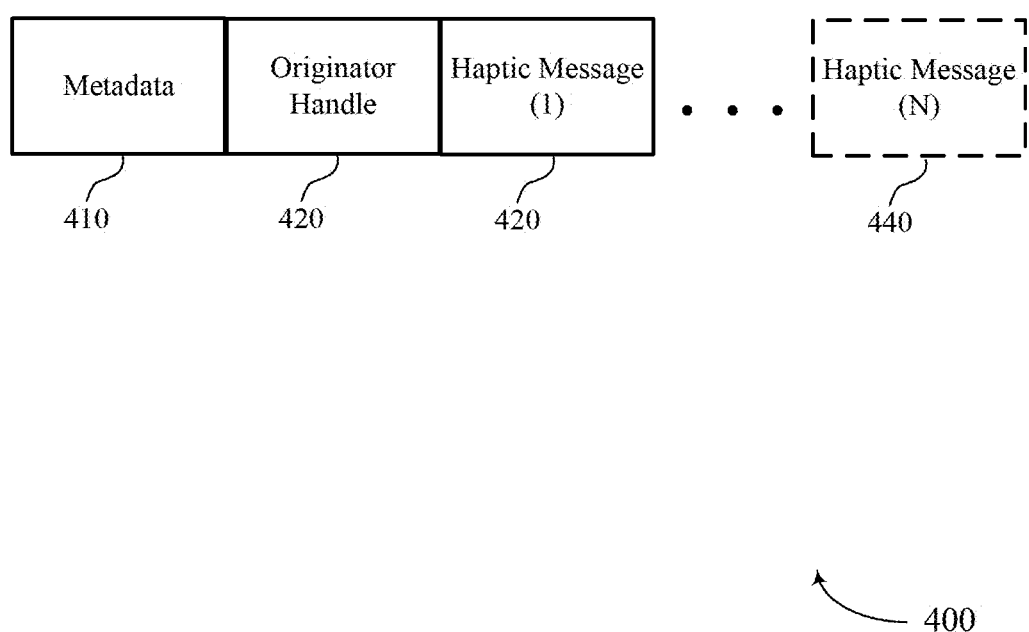
FIG. 4 illustrates an example of a digital message that supports techniques for haptics communication in accordance with aspects of the present disclosure.

FIG. 4 illustrates an example of a digital message 400 That supports techniques for haptics communication in accordance with aspects of the present disclosure.

In some aspects, the digital message 400 may include metadata 410, an originator handle 420, a first haptic message 430, and, optionally, additional haptics messages up to haptic message N 440. In some aspects, each of the originator handle 420 and the first haptic message 430 may represent a spatiotemporal physical pattern. In some aspects, the originator handle 420 and the first haptic message 430 may be activated sequentially (in either order) or concurrently (e.g., superimposed) by a receiving device.

Figure 5:
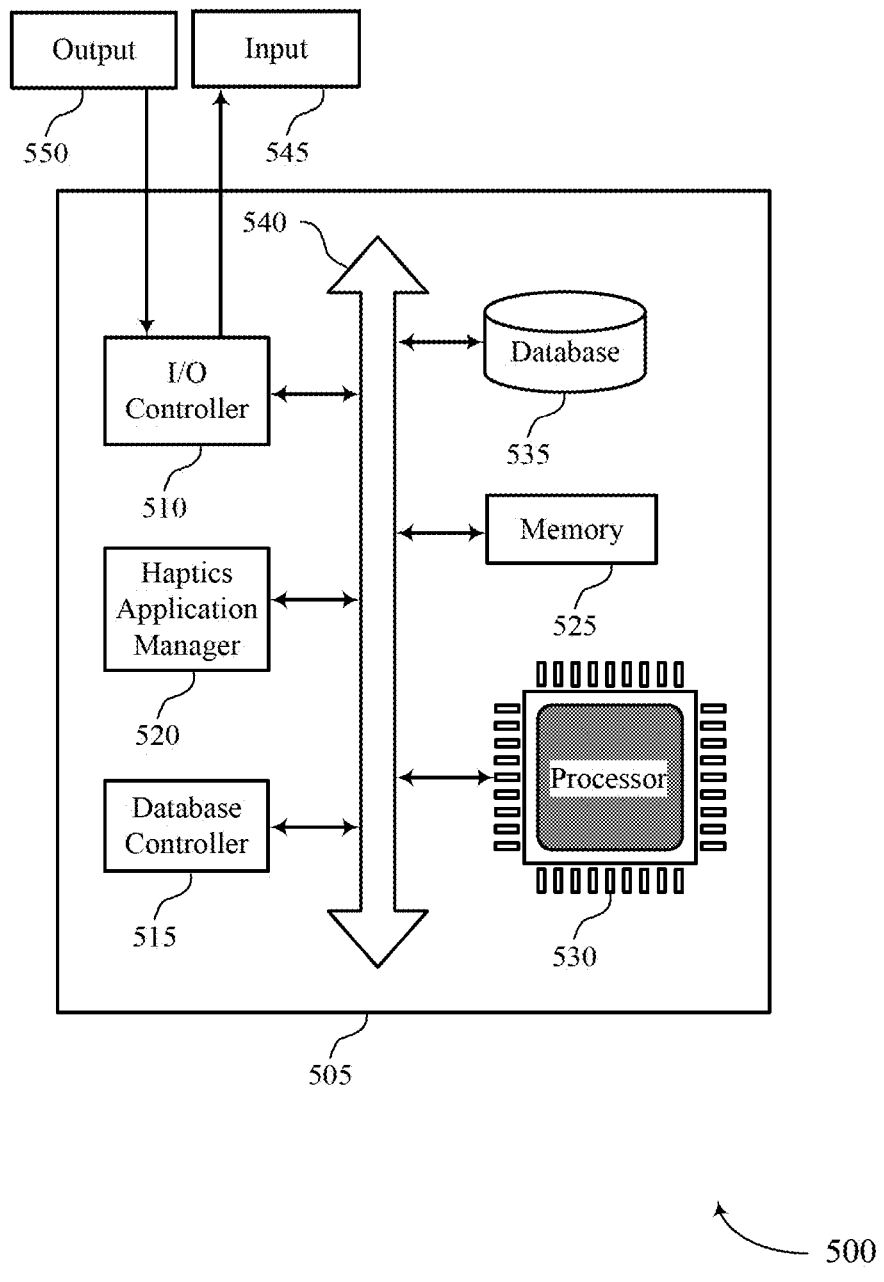
FIG. 5 shows a diagram of a system including a device that supports techniques for haptics communication in accordance with aspects of the present disclosure.

FIG. 5 shows a diagram of a system 500 including a device 505 (e.g., a server) that supports techniques for haptics communication in accordance with aspects of the present disclosure. The device 505 may be an example of or include the components of the haptic application server 155, the haptic application server 255, or the like as described herein. The device 505 may include components for bi-directional data communications including components for transmitting and receiving communications, such as a haptics application manager 520, an I/O controller 510, a database controller 515, a memory 525, a processor 530, and a database 535. These components may be in electronic communication or otherwise coupled (e.g., operatively, communicatively, functionally, electronically, electrically) via one or more buses (e.g., a bus 540).

The I/O controller 510 may manage input signals 545 and output signals 550 for the device 505. The I/O controller 510 may also manage peripherals not integrated into the device 505. In some cases, the I/O controller 510 may represent a physical connection or port to an external peripheral. In some cases, the I/O controller 510 may utilize an operating system such as iOS®, ANDROID®, MS-DOS®, MS-WINDOWS®, OS/2®, UNIX®, LINUX®, watchOS®, wearOS®, Tizen®, or another known operating system. In other cases, the I/O controller 510 may represent or interact with a modem, a keyboard, a mouse, a touchscreen, a watch face, a remote control, or a similar device. In some cases, the I/O controller 510 may be implemented as part of a processor 530. In some examples, a user may interact with the device 505 via the I/O controller 510 or via hardware components controlled by the I/O controller 510.

The database controller 515 may manage data storage and processing in a database 535. In some cases, a user may interact with the database controller 515. In other cases, the database controller 515 may operate automatically without user interaction. The database 535 may be an example of a single database, a distributed database, multiple distributed databases, a data store, a data lake, or an emergency backup database.

Memory 525 may include random-access memory (RAM) and ROM. The memory 525 may store computer-readable, computer-executable software including instructions that, when executed, cause the processor 530 to perform various functions described herein. In some cases, the memory 525 may contain, among other things, a BIOS which may control basic hardware or software operation such as the interaction with peripheral components or devices.

The processor 530 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 530 may be configured to operate a memory array using a memory controller. In other cases, a memory controller may be integrated into the processor 530. The processor 530 may be configured to execute computer-readable instructions stored in a memory 525 to perform various functions (e.g., functions or tasks supporting techniques for haptics communication).

For example, the haptics application manager 520 may be configured as or otherwise support a means for detecting an indication to create a haptic message on a device. The haptics application manager 520 may be configured as or otherwise support a means for displaying a field for entering sentiment information based at least in part on the detecting the indication. The haptics application manager 520 may be configured as or otherwise support a means for displaying a plurality of haptic indicators for selection. In some embodiments, the haptics application manager 520 may be configured as or otherwise support a means for displaying a plurality of timing indicators for selection. The plurality of haptic indicators and timing indicators may be associated with the sentiment information.

The haptics application manager 520 may be configured as or otherwise support a means for obtaining one or more selected haptic indicators from the plurality of haptic indicators. In some embodiments, the haptics application manager 520 may be configured as or otherwise support a means for obtaining one or more selected timing indicators from the plurality of timing indicators. The haptics application manager 520 may be configured as or otherwise support a means for generating a haptic message as an association between the sentiment information and the one or more selected haptic indicators. In some embodiments, the haptics application manager 520 may be configured as or otherwise support a means for generating the haptic message as an association between the sentiment information and timing indicators, or any combination of timing and haptic indicators.

For example, the haptics application manager 520 may be configured as or otherwise support a means for detecting an indication to assign a haptic modifier to a haptic handle. The haptics application manager 520 may be configured as or otherwise support a means for displaying one or more recipient indicators to select for assigning the haptic modifier based at least in part on the detecting the indication. The haptics application manager 520 may be configured as or otherwise support a means for obtaining a selected recipient indicator from the one or more recipient indicators. The haptics application manager 520 may be configured as or otherwise support a means for displaying a plurality of haptic indicators for selection as the haptic modifier. The haptics application manager 520 may be configured as or otherwise support a means for obtaining one or more selected haptic indicators from the plurality of haptic indicators for the haptic modifier. The haptics application manager 520 may be configured as or otherwise support a means for assigning the haptic modifier to the selected recipient indicator.

Additionally or alternatively, the haptics application manager 520 may support communication by a first device in accordance with examples as disclosed herein. For example, the haptics application manager 520 may be configured as or otherwise support a means for obtaining sentiment information to be communicated to a second device associated with a receiving entity. The haptics application manager 520 may be configured as or otherwise support a means for determining first haptic information corresponding to a transmitting entity and second haptic information corresponding to the sentiment information. The haptics application manager 520 may be configured as or otherwise support a means for formatting a digital message for transmission to the second device to include the first haptic information and the second haptic information. The haptics application manager 520 may be configured as or otherwise support a means for transmitting the digital message to the second device associated with the receiving entity.

Additionally or alternatively, the haptics application manager 520 may support communication by a second device different from a first device in accordance with examples as disclosed herein. For example, the haptics application manager 520 may be configured as or otherwise support a means for receiving, from the first device associated with a transmitting entity, a digital message. The haptics application manager 520 may be configured as or otherwise support a means for determining, based at least in part on a format of the digital message, first haptic information corresponding to the transmitting entity and second haptic information corresponding to sentiment information. The haptics application manager 520 may be configured as or otherwise support a means for initiating a first haptic rudiment associated with the first haptic information and a second haptic rudiment associated with the second haptic information using one or more haptic actuators of the second device.

Additionally or alternatively, the haptics application manager 520 may support communication by a server in accordance with examples as disclosed herein. For example, the haptics application manager 520 may be configured as or otherwise support a means for receiving, from a plurality of first devices associated with a plurality of transmitting entities, a plurality of digital messages, wherein each of the plurality of digital messages comprises sentiment information to be communicated to a second device associated with a receiving entity. The haptics application manager 520 may be configured as or otherwise support a means for determining, for each of the plurality of digital messages, a first haptic information corresponding to a transmitting entity of the plurality of transmitting entities and second haptic information corresponding to the sentiment information, or visa versa. The haptics application manager 520 may be configured as or otherwise support a means for identifying a pattern associated with aggregated sentiment information from the plurality of digital messages. The haptics application manager 520 may be configured as or otherwise support a means for formatting a second digital message for transmission to the second device to include third haptic information corresponding to the aggregated sentiment information. The haptics application manager 520 may be configured as or otherwise support a means for transmitting the second digital message to the second device associated with the receiving entity.

By including or configuring the haptics application manager 520 in accordance with examples as described herein, the device 505 may support techniques for haptics communication. In some implementations, the device 505 may be operatively coupled with one or more devices, such as a UE 115 or device 605 discussed herein.

Figure 6:
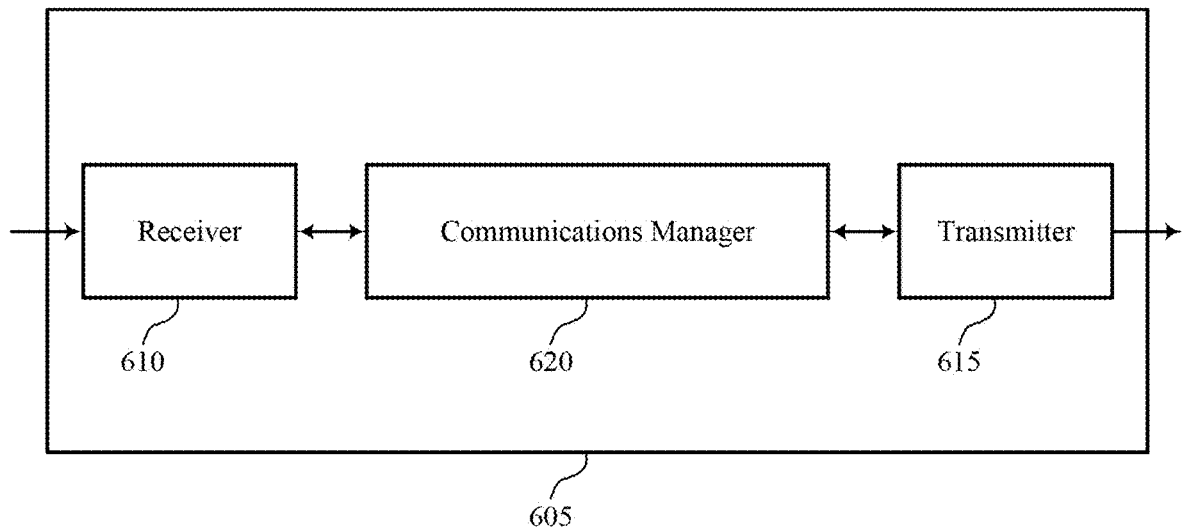
FIGS. 6 and 7 show block diagrams of devices that support techniques for haptics communication in accordance with aspects of the present disclosure.

FIG. 6 shows a block diagram 600 of a device 605 that supports techniques for haptics communication in accordance with aspects of the present disclosure. The device 605 may be an example of aspects of a UE 115 as described herein. The device 605 may include a receiver 610, a transmitter 615, and a communications manager 620. The device 605 may also include a processor. Each of these components may be in communication with one another (e.g., via one or more buses).

The receiver 610 may provide a means for receiving information such as packets, user data, control information, or any combination thereof associated with various information channels (e.g., control channels, data channels, information channels related to techniques for haptics communication). Information may be passed on to other components of the device 605. The receiver 610 may utilize a single antenna or a set of multiple antennas.

The transmitter 615 may provide a means for transmitting signals generated by other components of the device 605. For example, the transmitter 615 may transmit information such as packets, user data, control information, or any combination thereof associated with various information channels (e.g., control channels, data channels, information channels related to techniques for haptics communication). In some examples, the transmitter 615 may be co-located with a receiver 610 in a transceiver module. The transmitter 615 may utilize a single antenna or a set of multiple antennas.

The communications manager 620, the receiver 610, the transmitter 615, or various combinations thereof or various components thereof may be examples of means for performing various aspects of techniques for haptics communication as described herein. For example, the communications manager 620, the receiver 610, the transmitter 615, or various combinations or components thereof may support a method for performing one or more of the functions described herein.

In some examples, the communications manager 620, the receiver 610, the transmitter 615, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 620, the receiver 610, the transmitter 615, or various combinations or components thereof may be implemented in code (e.g., as communications management software or firmware) executed by a processor. If implemented in code executed by a processor, the functions of the communications manager 620, the receiver 610, the transmitter 615, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 620 may be configured to perform various operations (e.g., receiving, monitoring, transmitting) using or otherwise in cooperation with the receiver 610, the transmitter 615, or both. For example, the communications manager 620 may receive information from the receiver 610, send information to the transmitter 615, or be integrated in combination with the receiver 610, the transmitter 615, or both to receive information, transmit information, or perform various other operations as described herein.

For example, the communications manager 620 may be configured as or otherwise support a means for detecting an indication to create a haptic message on a device. The communications manager 620 may be configured as or otherwise support a means for displaying a field for entering sentiment information based on the detecting the indication. The communications manager 620 may be configured as or otherwise support a means for displaying a set of multiple haptic indicators for selection. In some embodiments, the communications manager 620 may be configured as or otherwise support a means for displaying a set of multiple timing indicators for selection. The sets of multiple haptic indicators and timing indicators may be associated with the sentiment information.

The communications manager 620 may be configured as or otherwise support a means for obtaining one or more selected haptic indicators from the set of multiple haptic indicators. In some embodiments, the communications manager 620 may be configured as or otherwise support a means for obtaining one or more selected timing indicators from the set of multiple timing indicators. The communications manager 620 may be configured as or otherwise support a means for generating a haptic message as an association between the sentiment information and the one or more selected haptic indicators. In some embodiments, the communications manager 620 may be configured as or otherwise support a means for generating the haptic message as an association between the sentiment information and the one or more selected timing indicators, or any combination of timing and haptic indicators.

For example, the communications manager 620 may be configured as or otherwise support a means for detecting an indication to assign a haptic modifier to a haptic handle. The communications manager 620 may be configured as or otherwise support a means for displaying one or more recipient indicators to select for assigning the haptic modifier based on the detecting the indication. The communications manager 620 may be configured as or otherwise support a means for obtaining a selected recipient indicator from the one or more recipient indicators. The communications manager 620 may be configured as or otherwise support a means for displaying a set of multiple haptic indicators for selection as the haptic modifier. The communications manager 620 may be configured as or otherwise support a means for obtaining one or more selected haptic indicators from the set of multiple haptic indicators for the haptic modifier. The communications manager 620 may be configured as or otherwise support a means for assigning the haptic modifier to the selected recipient indicator.

Additionally or alternatively, the communications manager 620 may support communication by a first device in accordance with examples as disclosed herein. For example, the communications manager 620 may be configured as or otherwise support a means for obtaining sentiment information to be communicated to a second device associated with a receiving entity. The communications manager 620 may be configured as or otherwise support a means for determining first haptic information corresponding to a transmitting entity and second haptic information corresponding to the sentiment information. The communications manager 620 may be configured as or otherwise support a means for formatting a digital message for transmission to the second device to include the first haptic information and the second haptic information. The communications manager 620 may be configured as or otherwise support a means for transmitting the digital message to the second device associated with the receiving entity.

Additionally or alternatively, the communications manager 620 may support communication by a second device different from a first device in accordance with examples as disclosed herein. For example, the communications manager 620 may be configured as or otherwise support a means for receiving, from the first device associated with a transmitting entity, a digital message. The communications manager 620 may be configured as or otherwise support a means for determining, based on a format of the digital message, first haptic information corresponding to the transmitting entity and second haptic information corresponding to sentiment information. The communications manager 620 may be configured as or otherwise support a means for initiating a first haptic rudiment associated with the first haptic information and a second haptic rudiment associated with the second haptic information using one or more haptic actuators of the second device.

By including or configuring the communications manager 620 in accordance with examples as described herein, the device 605 (e.g., a processor controlling or otherwise coupled to the receiver 610, the transmitter 615, the communications manager 620, or a combination thereof) may support techniques for haptics communication described herein.

In some examples, the communications manager 620 may be configured to operate with one or more haptic actuators. For example, communications manager 620 may be configured to operate with pressure-sensitive technology of the device 605 that provides haptic feedback. The communications manager 620 may be configured to operate with haptic actuator or components, such as but not limited to a vibratory motor or physical resistance mechanisms of the device 605. The communications manager 620 may be configured to operate with actuator or components that impart kinesthetic or tactile information that may be felt through the skin, such as but not limited to pressure, temperature, vibration, texture, shape, stiffness, or pain. In some cases, the one or more actuators may comprise a vibration unit that outputs that tactile information.

Figure 7:
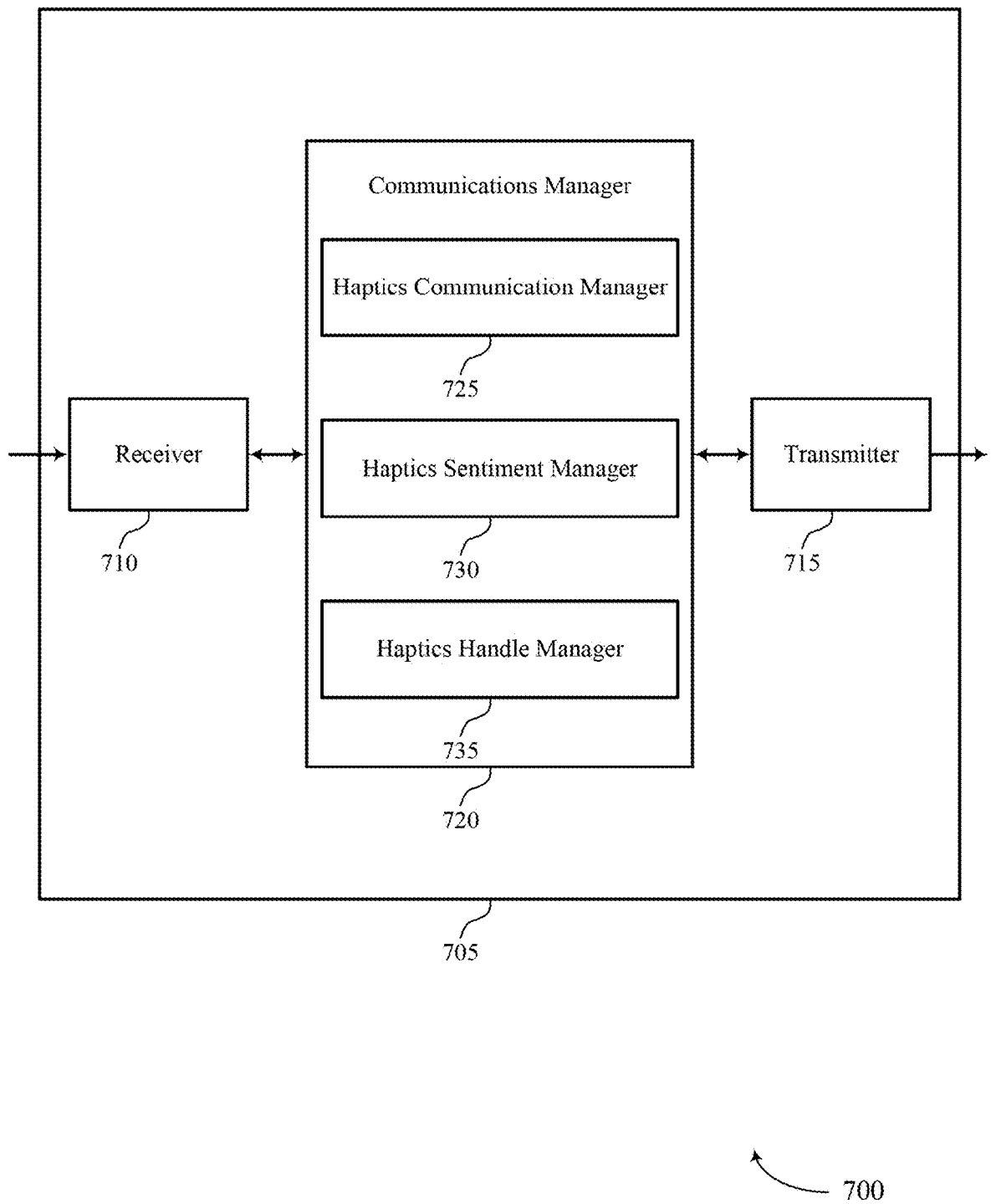

FIG. 7 shows a block diagram 700 of a device 705 that supports techniques for haptics communication in accordance with aspects of the present disclosure. The device 705 may be an example of aspects of a device 605 or a UE 115 as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for haptics communication). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for haptics communication). In some examples, the transmitter 715 may be co-located with a receiver 710 in a transceiver module. The transmitter 715 may utilize a single antenna or a set of multiple antennas.

The device 705, or various components thereof, may be an example of means for performing various aspects of techniques for haptics communication as described herein. For example, the communications manager 720 may include a haptics communication manager 725, a haptics sentiment manager 730, a haptics handle manager 735, or any combination thereof. The communications manager 720 may be an example of aspects of a communications manager 620 as described herein. In some examples, the communications manager 720, or various components thereof, may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The haptics communication manager 725 may be configured as or otherwise support a means for detecting an indication to create a haptic message. The haptics sentiment manager 730 may be configured as or otherwise support a means for displaying a field for entering sentiment information based on the detecting the indication. The haptics communication manager 725 may be configured as or otherwise support a means for displaying a set of multiple haptic indicators for selection. In some embodiments, the haptics communication manager 725 may be configured as or otherwise support a means for displaying a set of multiple timing indicators for selection. The haptic indicators and timing indicators may be associated with the sentiment information.

The haptics communication manager 725 may be configured as or otherwise support a means for obtaining one or more selected haptic indicators from the set of multiple haptic indicators. In some embodiments, the haptics communication manager 725 may be configured as or otherwise support a means for obtaining one or more selected timing indicators from the set of multiple timing indicators. The haptics sentiment manager 730 may be configured as or otherwise support a means for generating a haptic message as an association between the sentiment information and the one or more selected haptic indicators. In some embodiments, the haptics communication manager 725 may be configured as or otherwise support a means for generating an association between the sentiment information and the set of multiple timing indicators, or any combination of the sets of multiple timing and haptic indicators.

The haptics communication manager 725 may be configured as or otherwise support a means for detecting an indication to assign a haptic modifier to a haptic handle. The haptics handle manager 735 may be configured as or otherwise support a means for displaying one or more recipient indicators to select for assigning the haptic modifier based on the detecting the indication. The haptics handle manager 735 may be configured as or otherwise support a means for obtaining a selected recipient indicator from the one or more recipient indicators. The haptics handle manager 735 may be configured as or otherwise support a means for displaying a set of multiple haptic indicators for selection as the haptic modifier. The haptics handle manager 735 may be configured as or otherwise support a means for obtaining one or more selected haptic indicators from the set of multiple haptic indicators for the haptic modifier. The haptics communication manager 725 may be configured as or otherwise support a means for assigning the haptic modifier to the selected recipient indicator.

Additionally or alternatively, the communications manager 720 may support communication by a first device in accordance with examples as disclosed herein. The haptics sentiment manager 730 may be configured as or otherwise support a means for obtaining sentiment information to be communicated to a second device associated with a receiving entity. The haptics communication manager 725 may be configured as or otherwise support a means for determining first haptic information corresponding to a transmitting entity and second haptic information corresponding to the sentiment information. The haptics communication manager 725 may be configured as or otherwise support a means for formatting a digital message for transmission to the second device to include the first haptic information and the second haptic information. The haptics communication manager 725 may be configured as or otherwise support a means for transmitting the digital message to the second device associated with the receiving entity.

Additionally or alternatively, the communications manager 720 may support communication by a second device different from a first device in accordance with examples as disclosed herein. The haptics communication manager 725 may be configured as or otherwise support a means for receiving, from the first device associated with a transmitting entity, a digital message. The haptics communication manager 725 may be configured as or otherwise support a means for determining, based on a format of the digital message, first haptic information corresponding to the transmitting entity and second haptic information corresponding to sentiment information, or visa versa. The haptics communication manager 725 may be configured as or otherwise support a means for initiating a first haptic rudiment associated with the first haptic information and a second haptic rudiment associated with the second haptic information using one or more haptic actuators of the second device.

Figure 8:
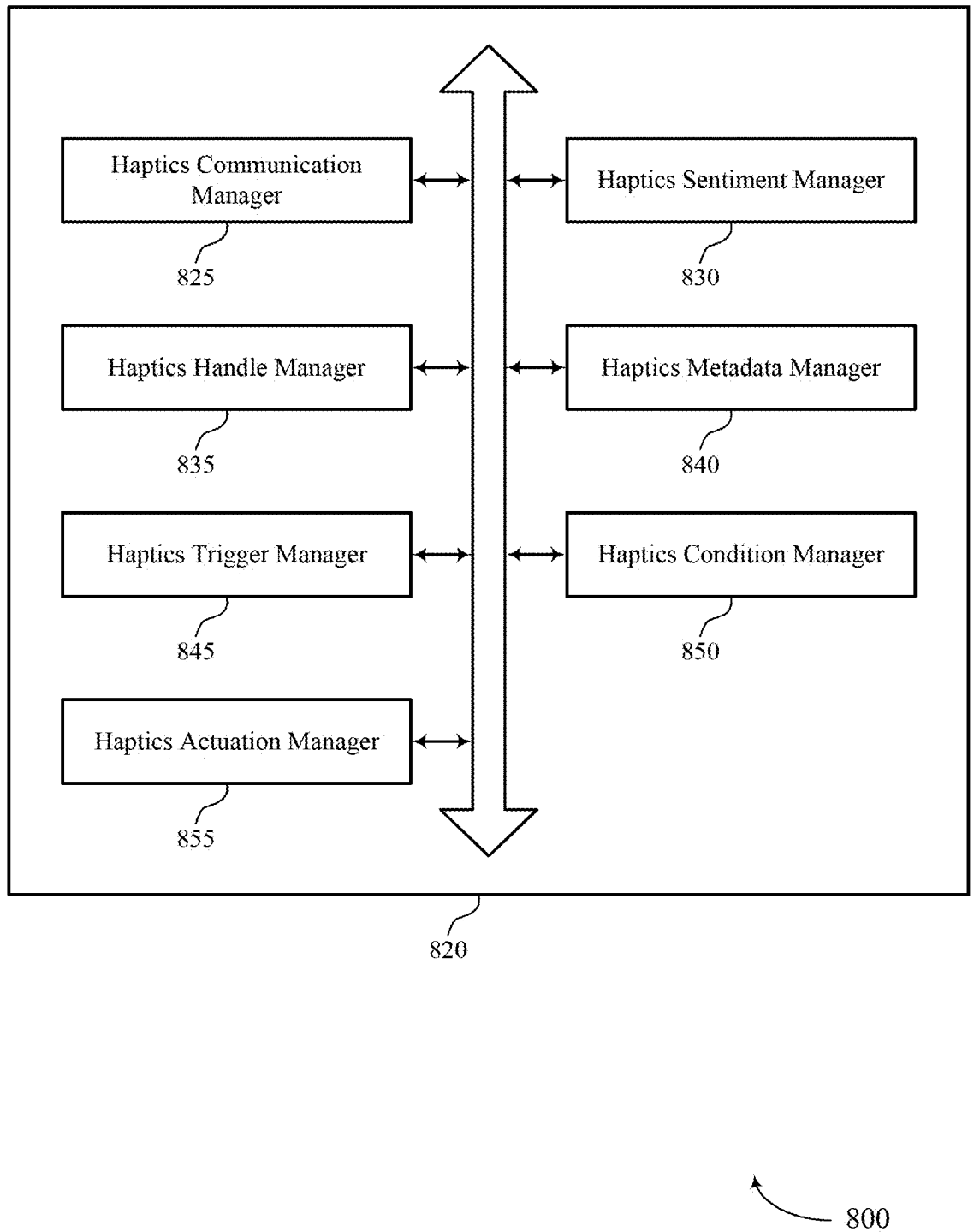
FIG. 8 shows a block diagram of a communications manager that supports techniques for haptics communication in accordance with aspects of the present disclosure.

FIG. 8 shows a block diagram 800 of a communications manager 820 that supports techniques for haptics communication in accordance with aspects of the present disclosure. The communications manager 820 may be an example of aspects of a communications manager 620, a communications manager 720, or both, as described herein. The communications manager 820, or various components thereof, may be an example of means for performing various aspects of techniques for haptics communication as described herein. For example, the communications manager 820 may include a haptics communication manager 825, a haptics sentiment manager 830, a haptics handle manager 835, a haptics metadata manager 840, a haptics trigger manager 845, a haptics condition manager 850, a haptics actuation manager 855, or any combination thereof. Each of these components may communicate, directly or indirectly, with one another (e.g., via one or more buses).

The haptics communication manager 825 may be configured as or otherwise support a means for detecting an indication to create a haptic message. The haptics sentiment manager 830 may be configured as or otherwise support a means for displaying a field for entering sentiment information based on the detecting the indication. In some examples, the haptics communication manager 825 may be configured as or otherwise support a means for displaying a set of multiple haptic indicators for selection. In some embodiments, the haptics communication manager 825 may be configured as or otherwise support a means for displaying a set of multiple timing indicators for selection. The set of multiple timing indicators may be associated with the sentiment information.

In some examples, the haptics communication manager 825 may be configured as or otherwise support a means for obtaining one or more selected haptic indicators from the set of multiple haptic indicators. In some embodiments, the haptics communication manager 825 may be configured as or otherwise support a means for obtaining one or more selected timing indicators from the set of multiple timing indicators. In some examples, the haptics sentiment manager 830 may be configured as or otherwise support a means for generating a haptic message as an association between the sentiment information and the one or more selected haptic indicators. In some embodiments, the haptics sentiment manager 830 may be configured as or otherwise support a means for generating the haptic message as an association between the sentiment information and the one or more selected timing indicators, or any combination of the one or more selected timing and haptic indicators.

In some examples, the haptics sentiment manager 830 may be configured as or otherwise support a means for obtaining, via the field, textual information corresponding to the sentiment information.

In some examples, the haptics sentiment manager 830 may be configured as or otherwise support a means for obtaining, via the field, an image corresponding to the sentiment information.

In some examples, the one or more selected haptic indicators includes at least one of a haptic rudiment or a configured haptic message.

In some examples, the haptic rudiment is associated with a vibrating pattern caused by a haptic actuator. For example, the haptic actuator may comprise an eccentric rotating mass vibration motor. In some cases, a first mass of a first haptic actuator has a mass different from a second mass of a second haptic actuator. In some cases, a first frequency range of the first haptic actuator has a frequency range different from a second frequency range of the second haptic actuator. The first and second haptic actuators may be associated with different haptic rudiments and associated haptic indicators.

In some examples, the haptic rudiment is associated with a stiffness or force caused by a haptic actuator. For example, the haptic actuator may apply a stiffness or force to shape a hand or finger (or other body part). In some cases, the haptic actuator may be a hand controller with one or more hinged finger mechanisms comprising torque actuators.

In some examples, the haptic rudiment is associated with thermal conductivity change caused by an actuator or heat-generating assembly. For example, the actuator or heat-generating assembly may cause an increase in a temperature change on a particular location of the device as the haptic rudiment.

In some examples, the haptic rudiment is associated with a tactile sensation, or fingertip skin orientation caused by an actuator or actuators rendering a 3D shape or texture.

In some examples, the haptic rudiment is associated with a plurality of actuated surfaces that stretch or compress the skin.

In some examples, to support obtaining the one or more selected haptic indicators, the haptics communication manager 825 may be configured as or otherwise support a means for obtaining a first haptic indicator and a second haptic indicator from the set of multiple haptic indicators.

In some examples, the haptics communication manager 825 may be configured as or otherwise support a means for obtaining an indication that a first haptic rudiment associated with the first haptic indicator is to be initiated first in time and a second haptic rudiment associated with the second haptic indicator is to be initiated second in time.

In some examples, the haptics communication manager 825 may be configured as or otherwise support a means for obtaining an indication that a first haptic rudiment associated with the first haptic indicator and a second haptic rudiment associated with the second haptic indicator are to be initiated concurrently.

In some examples, the haptics communication manager 825 may be configured as or otherwise support a means for displaying the haptic message for selecting to send to one or more recipient indicators.

In some examples, the haptics communication manager 825 may be configured as or otherwise support a means for detecting an indication to assign a haptic modifier to a haptic handle. The haptics handle manager 835 may be configured as or otherwise support a means for displaying one or more recipient indicators to select for assigning the haptic modifier based on the detecting the indication. In some examples, the haptics handle manager 835 may be configured as or otherwise support a means for obtaining a selected recipient indicator from the one or more recipient indicators. In some examples, the haptics handle manager 835 may be configured as or otherwise support a means for displaying a set of multiple haptic indicators for selection as the haptic modifier. In some examples, the haptics handle manager 835 may be configured as or otherwise support a means for obtaining one or more selected haptic indicators from the set of multiple haptic indicators for the haptic modifier. In some examples, the haptics communication manager 825 may be configured as or otherwise support a means for assigning the haptic modifier to the selected recipient indicator.

In some examples, the haptic modifier is a haptic suffix appended to the haptic handle of the selected recipient indicator. For example, the haptic suffix may be initiated after the haptic handle associated with recipient indicator is initiated. In some cases, the haptic modifier may be a haptic prefix. That is, the haptic prefix may be initiated prior to initiation of the haptic handle associated with recipient indicator.

In some examples, the haptics handle manager 835 may be configured as or otherwise support a means for displaying an indication of the haptic modifier with an image associated with the selected recipient indicator.

Additionally or alternatively, the communications manager 820 may support communication by a first device in accordance with examples as disclosed herein. In some examples, the haptics sentiment manager 830 may be configured as or otherwise support a means for obtaining sentiment information to be communicated to a second device associated with a receiving entity. In some examples, the haptics communication manager 825 may be configured as or otherwise support a means for determining first haptic information corresponding to a transmitting entity and second haptic information corresponding to the sentiment information. In some examples, the haptics communication manager 825 may be configured as or otherwise support a means for formatting a digital message for transmission to the second device to include the first haptic information and the second haptic information. In some examples, the haptics communication manager 825 may be configured as or otherwise support a means for transmitting the digital message to the second device associated with the receiving entity.

In some examples, the first haptic information corresponds to a haptic handle associated with the transmitting entity.

In some examples, the second haptic information corresponds to a haptic message created by the transmitting entity.

In some examples, to support formatting the digital message for transmission, the haptics communication manager 825 may be configured as or otherwise support a means for formatting the digital message for transmission to the second device to include the first haptic information in a first field and the second haptic information in a second field different from the first field.

In some examples, the haptics metadata manager 840 may be configured as or otherwise support a means for formatting the digital message for transmission to the second device to include metadata corresponding to at least one of the sentiment information, the first device, or the second device.

In some examples, the haptics trigger manager 845 may be configured as or otherwise support a means for obtaining a trigger indication for the transmitting the digital message to the second device.

In some examples, to support transmitting the digital message to the second device, the haptics trigger manager 845 may be configured as or otherwise support a means for transmitting the digital message to the second device based on satisfying a trigger corresponding to the trigger indication.

In some examples, the haptics trigger manager 845 may be configured as or otherwise support a means for detecting, based at least on a sensor associated with the first device, a trigger for transmitting the digital message to the second device.

In some examples, the haptics condition manager 850 may be configured as or otherwise support a means for obtaining a conditional indication associated with the digital message. In some examples, the haptics metadata manager 840 may be configured as or otherwise support a means for formatting the digital message for transmission to the second device to include metadata corresponding to the conditional indication. For example, a conditional indicator may inform that the second device is to play or initiate the haptic message if battery level is determined to be sufficient. In some cases, a conditional indicator may inform that the second device is to play or initiate the haptic message if the second device is within a distance (e.g., one square mile) of a particular location (e.g., a location of a venue or a location of the first device).

Additionally or alternatively, the communications manager 820 may support communication by a second device different from a first device in accordance with examples as disclosed herein. In some examples, the haptics communication manager 825 may be configured as or otherwise support a means for receiving, from the first device associated with a transmitting entity, a digital message. In some examples, the haptics communication manager 825 may be configured as or otherwise support a means for determining, based on a format of the digital message, first haptic information corresponding to the transmitting entity and second haptic information corresponding to sentiment information. In some examples, the haptics communication manager 825 may be configured as or otherwise support a means for initiating a first haptic rudiment associated with the first haptic information and a second haptic rudiment associated with the second haptic information using one or more haptic actuators of the second device.

In some examples, the first haptic information corresponds to a haptic handle associated with the transmitting entity.

In some examples, the second haptic information corresponds to a haptic message created by the transmitting entity.

In some examples, to support initiating, the haptics actuation manager 855 may be configured as or otherwise support a means for initiating the first haptic rudiment associated with the first haptic information at a first time and the second haptic rudiment associated with the second haptic information at a second time.

In some examples, to support initiating, the haptics actuation manager 855 may be configured as or otherwise support a means for initiating the first haptic rudiment associated with the first haptic information and the second haptic rudiment associated with the second haptic information concurrently.

In some examples, to support determining, the haptics communication manager 825 may be configured as or otherwise support a means for determining, based on the format of the digital message, third haptic information corresponding to second sentiment information different from the sentiment information.

In some examples, to support initiating, the haptics actuation manager 855 may be configured as or otherwise support a means for initiating the second haptic rudiment associated with the second haptic information and a third haptic rudiment associated with the third haptic information concurrently.

Figure 9:
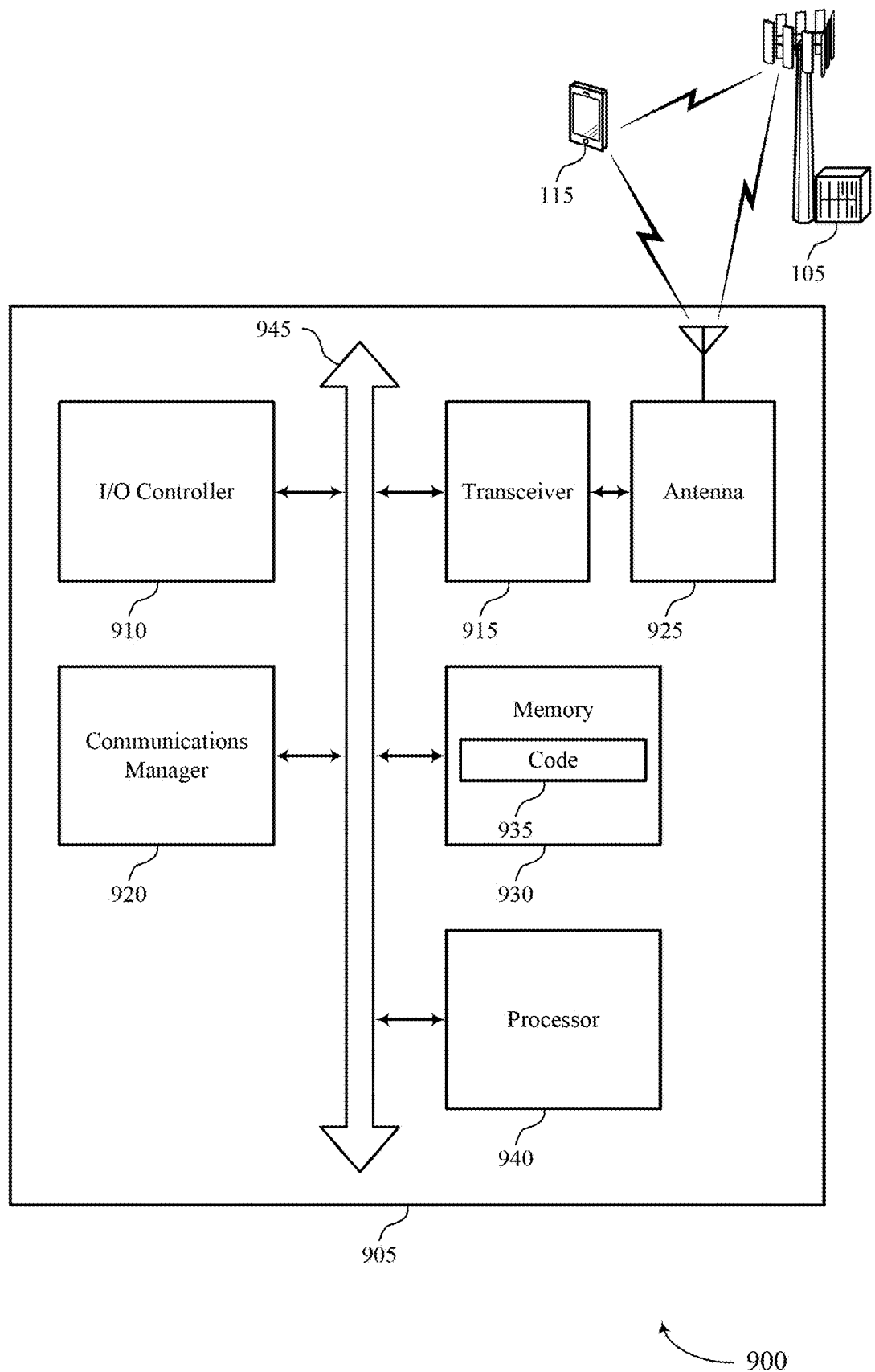
FIG. 9 shows a diagram of a system including a device that supports techniques for haptics communication in accordance with aspects of the present disclosure.

FIG. 9 shows a diagram of a system 900 including a device 905 that supports techniques for haptics communication in accordance with aspects of the present disclosure. The device 905 may be an example of or include the components of a device 605, a device 705, or a UE 115 as described herein. The device 905 may communicate wirelessly with one or more base stations 105, UEs 115, or any combination thereof. The device 905 may include components for bi-directional voice and data communications including components for transmitting and receiving communications, such as a communications manager 920, an input/output (I/O) controller 910, a transceiver 915, an antenna 925, a memory 930, code 935, and a processor 940. These components may be in electronic communication or otherwise coupled (e.g., operatively, communicatively, functionally, electronically, electrically) via one or more buses (e.g., a bus 945).

The I/O controller 910 may manage input and output signals for the device 905. The I/O controller 910 may also manage peripherals not integrated into the device 905. In some cases, the I/O controller 910 may represent a physical connection or port to an external peripheral. In some cases, the I/O controller 910 may utilize an operating system such as iOS®, ANDROID®, MS-DOS®, MS-WINDOWS®, OS/2®, UNIX®, LINUX®, or another known operating system. Additionally or alternatively, the I/O controller 910 may represent or interact with a modem, a keyboard, a mouse, a touchscreen, or a similar device. In some cases, the I/O controller 910 may be implemented as part of a processor, such as the processor 940. In some cases, a user may interact with the device 905 via the I/O controller 910 or via hardware components controlled by the I/O controller 910.

In some cases, the device 905 may include a single antenna 925. However, in some other cases, the device 905 may have more than one antenna 925, which may be capable of concurrently transmitting or receiving multiple wireless transmissions. The transceiver 915 may communicate bi-directionally, via the one or more antennas 925, wired, or wireless links as described herein. For example, the transceiver 915 may represent a wireless transceiver and may communicate bi-directionally with another wireless transceiver. The transceiver 915 may also include a modem to modulate the packets, to provide the modulated packets to one or more antennas 925 for transmission, and to demodulate packets received from the one or more antennas 925. The transceiver 915, or the transceiver 915 and one or more antennas 925, may be an example of a transmitter 615, a transmitter 715, a receiver 610, a receiver 710, or any combination thereof or component thereof, as described herein.

The memory 930 may include random access memory (RAM) and read-only memory (ROM). The memory 930 may store computer-readable, computer-executable code 935 including instructions that, when executed by the processor 940, cause the device 905 to perform various functions described herein. The code 935 may be stored in a non-transitory computer-readable medium such as system memory or another type of memory. In some cases, the code 935 may not be directly executable by the processor 940 but may cause a computer (e.g., when compiled and executed) to perform functions described herein. In some cases, the memory 930 may contain, among other things, a basic I/O system (BIOS) which may control basic hardware or software operation such as the interaction with peripheral components or devices.

The processor 940 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 940 may be configured to operate a memory array using a memory controller. In some other cases, a memory controller may be integrated into the processor 940. The processor 940 may be configured to execute computer-readable instructions stored in a memory (e.g., the memory 930) to cause the device 905 to perform various functions (e.g., functions or tasks supporting techniques for haptics communication). For example, the device 905 or a component of the device 905 may include a processor 940 and memory 930 coupled to the processor 940, the processor 940 and memory 930 configured to perform various functions described herein.

For example, the communications manager 920 may be configured as or otherwise support a means for detecting an indication to create a haptic message. The communications manager 920 may be configured as or otherwise support a means for displaying a field for entering sentiment information based on the detecting the indication. The communications manager 920 may be configured as or otherwise support a means for displaying a set of multiple haptic indicators for selection. In some embodiments, the communications manager 920 may be configured as or otherwise support a means for displaying a set of multiple timing indicators for selection. The set of multiple haptic indicators and timing indicators may be associated with the sentiment information.

The communications manager 920 may be configured as or otherwise support a means for obtaining one or more selected haptic indicators from the set of multiple haptic indicators. In some embodiments, the communications manager 920 may be configured as or otherwise support a means for obtaining one or more selected timing indicators from the set of multiple timing indicators The communications manager 920 may be configured as or otherwise support a means for generating a haptic message as an association between the sentiment information and the one or more selected haptic indicators. In some embodiments, the communications manager 920 may be configured as or otherwise support a means for generating the haptic message as an association between the sentiment information and timing indicators, or between any combination of selected timing and haptic indicators.

For example, the communications manager 920 may be configured as or otherwise support a means for detecting an indication to assign a haptic modifier to a haptic handle. The communications manager 920 may be configured as or otherwise support a means for displaying one or more recipient indicators to select for assigning the haptic modifier based on the detecting the indication. The communications manager 920 may be configured as or otherwise support a means for obtaining a selected recipient indicator from the one or more recipient indicators. The communications manager 920 may be configured as or otherwise support a means for displaying a set of multiple haptic indicators for selection as the haptic modifier. The communications manager 920 may be configured as or otherwise support a means for obtaining one or more selected haptic indicators from the set of multiple haptic indicators for the haptic modifier. The communications manager 920 may be configured as or otherwise support a means for assigning the haptic modifier to the selected recipient indicator.

Additionally or alternatively, the communications manager 920 may support communication by a first device in accordance with examples as disclosed herein. For example, the communications manager 920 may be configured as or otherwise support a means for obtaining sentiment information to be communicated to a second device associated with a receiving entity. The communications manager 920 may be configured as or otherwise support a means for determining first haptic information corresponding to a transmitting entity and second haptic information corresponding to the sentiment information. The communications manager 920 may be configured as or otherwise support a means for formatting a digital message for transmission to the second device to include the first haptic information and the second haptic information. The communications manager 920 may be configured as or otherwise support a means for transmitting the digital message to the second device associated with the receiving entity.

Additionally or alternatively, the communications manager 920 may support communication by a second device different from a first device in accordance with examples as disclosed herein. For example, the communications manager 920 may be configured as or otherwise support a means for receiving, from the first device associated with a transmitting entity, a digital message. The communications manager 920 may be configured as or otherwise support a means for determining, based on a format of the digital message, first haptic information corresponding to the transmitting entity and second haptic information corresponding to sentiment information. The communications manager 920 may be configured as or otherwise support a means for initiating a first haptic rudiment associated with the first haptic information and a second haptic rudiment associated with the second haptic information using one or more haptic actuators of the second device.

By including or configuring the communications manager 920 in accordance with examples as described herein, the device 905 may support techniques for haptics communication described herein.

In some examples, the communications manager 920 may be configured to perform various operations (e.g., receiving, monitoring, transmitting) using or otherwise in cooperation with the transceiver 915, the one or more antennas 925, or any combination thereof. Although the communications manager 920 is illustrated as a separate component, in some examples, one or more functions described with reference to the communications manager 920 may be supported by or performed by the processor 940, the memory 930, the code 935, or any combination thereof. For example, the code 935 may include instructions executable by the processor 940 to cause the device 905 to perform various aspects of techniques for haptics communication as described herein, or the processor 940 and the memory 930 may be otherwise configured to perform or support such operations.

Figure 10:
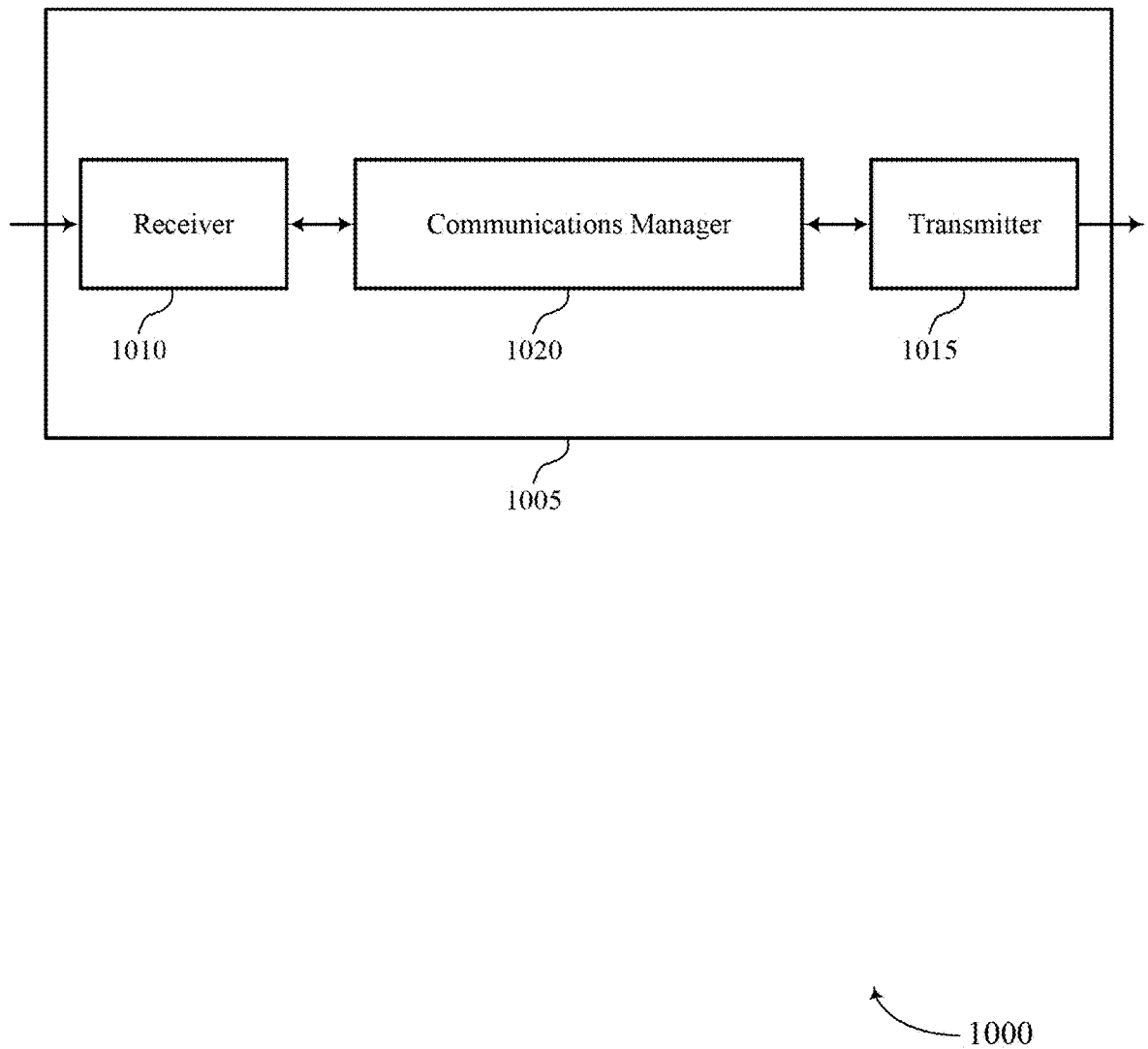
FIGS. 10 and 11 show block diagrams of devices that support techniques for haptics communication in accordance with aspects of the present disclosure.

FIG. 10 shows a block diagram 1000 of a device 1005 that supports techniques for haptics communication in accordance with aspects of the present disclosure. The device 1005 may be an example of aspects of a base station 105 as described herein. The device 1005 may include a receiver 1010, a transmitter 1015, and a communications manager 1020. The device 1005 may also include a processor. Each of these components may be in communication with one another (e.g., via one or more buses).

The receiver 1010 may provide a means for receiving information such as packets, user data, control information, or any combination thereof associated with various information channels (e.g., control channels, data channels, information channels related to techniques for haptics communication). Information may be passed on to other components of the device 1005. The receiver 1010 may utilize a single antenna or a set of multiple antennas.

The transmitter 1015 may provide a means for transmitting signals generated by other components of the device 1005. For example, the transmitter 1015 may transmit information such as packets, user data, control information, or any combination thereof associated with various information channels (e.g., control channels, data channels, information channels related to techniques for haptics communication). In some examples, the transmitter 1015 may be co-located with a receiver 1010 in a transceiver module. The transmitter 1015 may utilize a single antenna or a set of multiple antennas.

The communications manager 1020, the receiver 1010, the transmitter 1015, or various combinations thereof or various components thereof may be examples of means for performing various aspects of techniques for haptics communication as described herein. For example, the communications manager 1020, the receiver 1010, the transmitter 1015, or various combinations or components thereof may support a method for performing one or more of the functions described herein.

In some examples, the communications manager 1020, the receiver 1010, the transmitter 1015, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1020, the receiver 1010, the transmitter 1015, or various combinations or components thereof may be implemented in code (e.g., as communications management software or firmware) executed by a processor. If implemented in code executed by a processor, the functions of the communications manager 1020, the receiver 1010, the transmitter 1015, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1020 may be configured to perform various operations (e.g., receiving, monitoring, transmitting) using or otherwise in cooperation with the receiver 1010, the transmitter 1015, or both. For example, the communications manager 1020 may receive information from the receiver 1010, send information to the transmitter 1015, or be integrated in combination with the receiver 1010, the transmitter 1015, or both to receive information, transmit information, or perform various other operations as described herein.

The communications manager 1020 may support communication by a server in accordance with examples as disclosed herein. For example, the communications manager 1020 may be configured as or otherwise support a means for receiving, from a set of multiple first devices associated with a set of multiple transmitting entities, a set of multiple digital messages, where each of the set of multiple digital messages includes sentiment information to be communicated to a second device associated with a receiving entity. The communications manager 1020 may be configured as or otherwise support a means for determining, for each of the set of multiple digital messages, a first haptic information corresponding to a transmitting entity of the set of multiple transmitting entities and second haptic information corresponding to the sentiment information. The communications manager 1020 may be configured as or otherwise support a means for identifying a pattern associated with aggregated sentiment information from the set of multiple digital messages. The communications manager 1020 may be configured as or otherwise support a means for formatting a second digital message for transmission to the second device to include third haptic information corresponding to the aggregated sentiment information. The communications manager 1020 may be configured as or otherwise support a means for transmitting the second digital message to the second device associated with the receiving entity.

By including or configuring the communications manager 1020 in accordance with examples as described herein, the device 1005 (e.g., a processor controlling or otherwise coupled to the receiver 1010, the transmitter 1015, the communications manager 1020, or a combination thereof) may support techniques for haptics communication described herein.

Figure 11:
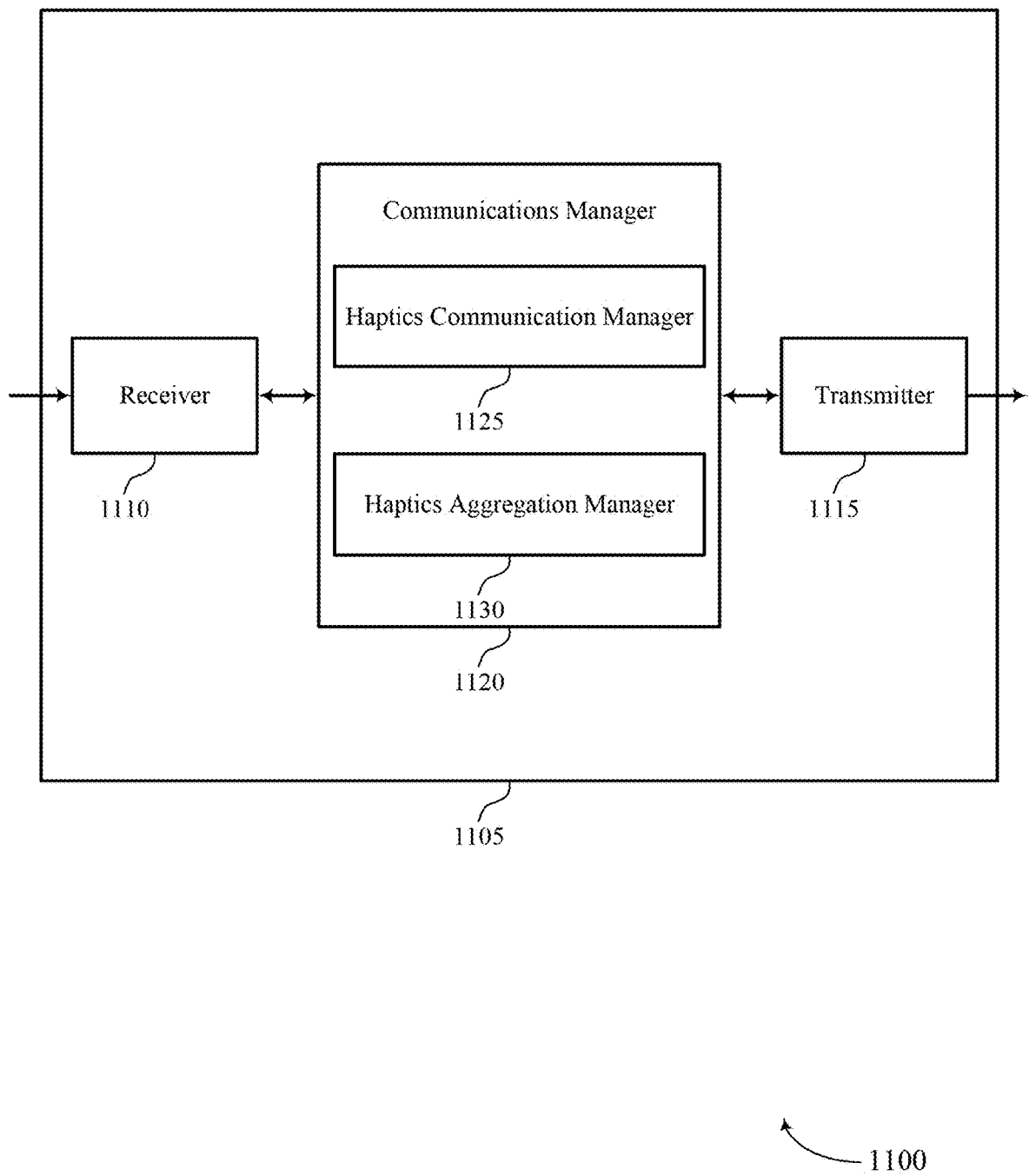

FIG. 11 shows a block diagram 1100 of a device 1105 that supports techniques for haptics communication in accordance with aspects of the present disclosure. The device 1105 may be an example of aspects of a device 1005 or a base station 105 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for haptics communication). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for haptics communication). In some examples, the transmitter 1115 may be co-located with a receiver 1110 in a transceiver module. The transmitter 1115 may utilize a single antenna or a set of multiple antennas.

The device 1105, or various components thereof, may be an example of means for performing various aspects of techniques for haptics communication as described herein. For example, the communications manager 1120 may include a haptics communication manager 1125 a haptics aggregation manager 1130, or any combination thereof. The communications manager 1120 may be an example of aspects of a communications manager 1020 as described herein. In some examples, the communications manager 1120, or various components thereof, may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support communication by a server in accordance with examples as disclosed herein. The haptics communication manager 1125 may be configured as or otherwise support a means for receiving, from a set of multiple first devices associated with a set of multiple transmitting entities, a set of multiple digital messages, where each of the set of multiple digital messages includes sentiment information to be communicated to a second device associated with a receiving entity. The haptics communication manager 1125 may be configured as or otherwise support a means for determining, for each of the set of multiple digital messages, a first haptic information corresponding to a transmitting entity of the set of multiple transmitting entities and second haptic information corresponding to the sentiment information. The haptics aggregation manager 1130 may be configured as or otherwise support a means for identifying a pattern associated with aggregated sentiment information from the set of multiple digital messages. The haptics communication manager 1125 may be configured as or otherwise support a means for formatting a second digital message for transmission to the second device to include third haptic information corresponding to the aggregated sentiment information. The haptics communication manager 1125 may be configured as or otherwise support a means for transmitting the second digital message to the second device associated with the receiving entity.

Figure 12:
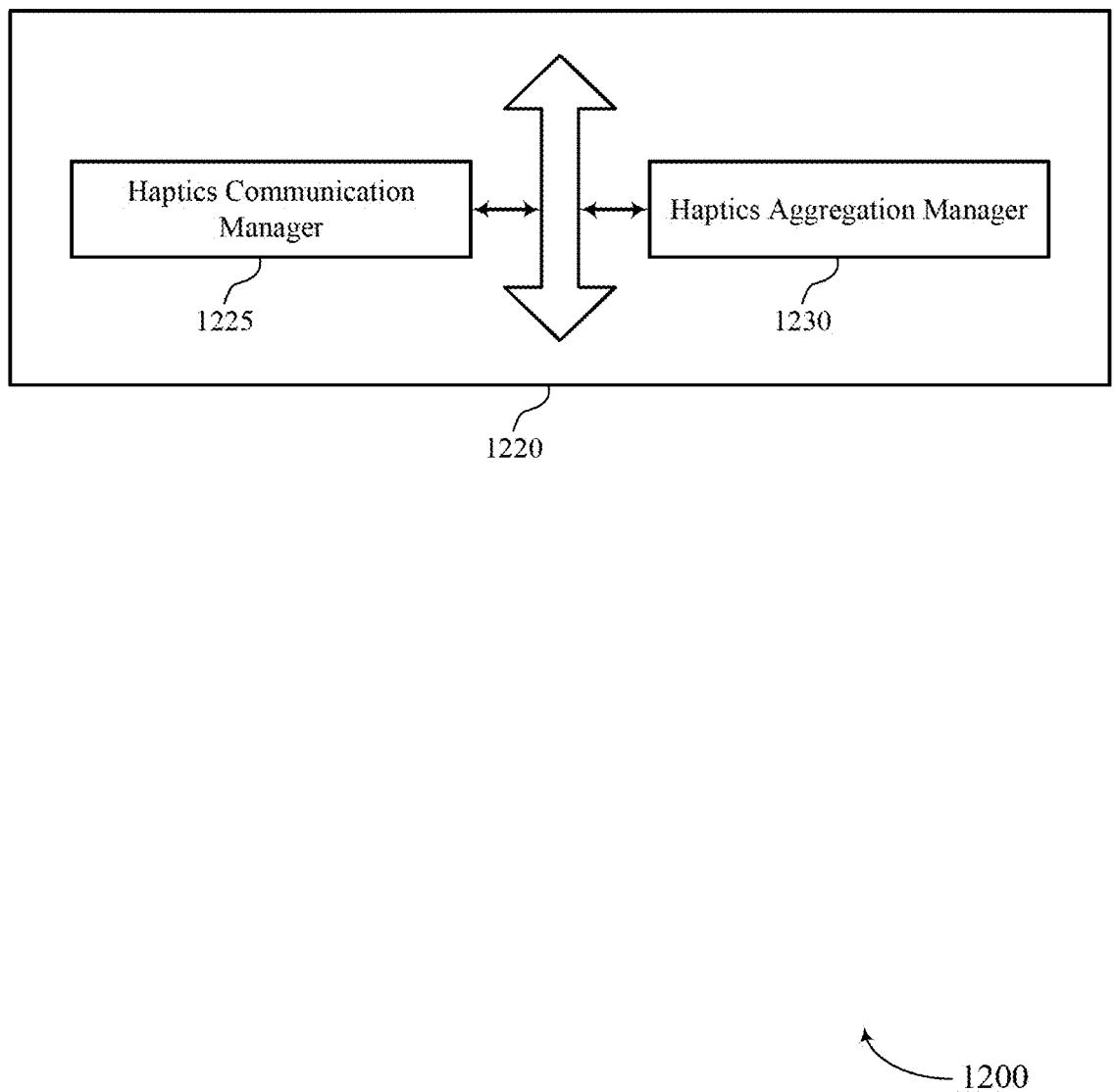
FIG. 12 shows a block diagram of a communications manager that supports techniques for haptics communication in accordance with aspects of the present disclosure.

FIG. 12 shows a block diagram 1200 of a communications manager 1220 that supports techniques for haptics communication in accordance with aspects of the present disclosure. The communications manager 1220 may be an example of aspects of a communications manager 1020, a communications manager 1120, or both, as described herein. The communications manager 1220, or various components thereof may be an example of means for performing various aspects of techniques for haptics communication as described herein. For example, the communications manager 1220 may include a haptics communication manager 1225 a haptics aggregation manager 1230, or any combination thereof. Each of these components may communicate, directly or indirectly, with one another (e.g., via one or more buses).

The communications manager 1220 may support communication by a server in accordance with examples as disclosed herein. The haptics communication manager 1225 may be configured as or otherwise support a means for receiving, from a set of multiple first devices associated with a set of multiple transmitting entities, a set of multiple digital messages, where each of the set of multiple digital messages includes sentiment information to be communicated to a second device associated with a receiving entity. In some examples, the haptics communication manager 1225 may be configured as or otherwise support a means for determining, for each of the set of multiple digital messages, a first haptic information corresponding to a transmitting entity of the set of multiple transmitting entities and second haptic information corresponding to the sentiment information. The haptics aggregation manager 1230 may be configured as or otherwise support a means for identifying a pattern associated with aggregated sentiment information from the set of multiple digital messages. In some examples, the haptics communication manager 1225 may be configured as or otherwise support a means for formatting a second digital message for transmission to the second device to include third haptic information corresponding to the aggregated sentiment information. In some examples, the haptics communication manager 1225 may be configured as or otherwise support a means for transmitting the second digital message to the second device associated with the receiving entity.

In some examples, the haptics aggregation manager 1230 may be configured as or otherwise support a means for performing an aggregation algorithm corresponding one or more characteristics of the set of multiple digital messages.

In some examples, to support identifying the pattern, the haptics aggregation manager 1230 may be configured as or otherwise support a means for identifying the pattern associated with aggregated sentiment information based on corresponding second haptic information from the set of multiple digital messages.

In some examples, to support identifying the pattern, the haptics aggregation manager 1230 may be configured as or otherwise support a means for identifying the pattern associated with aggregated sentiment information based on corresponding metadata from the set of multiple digital messages.

Figure 13:
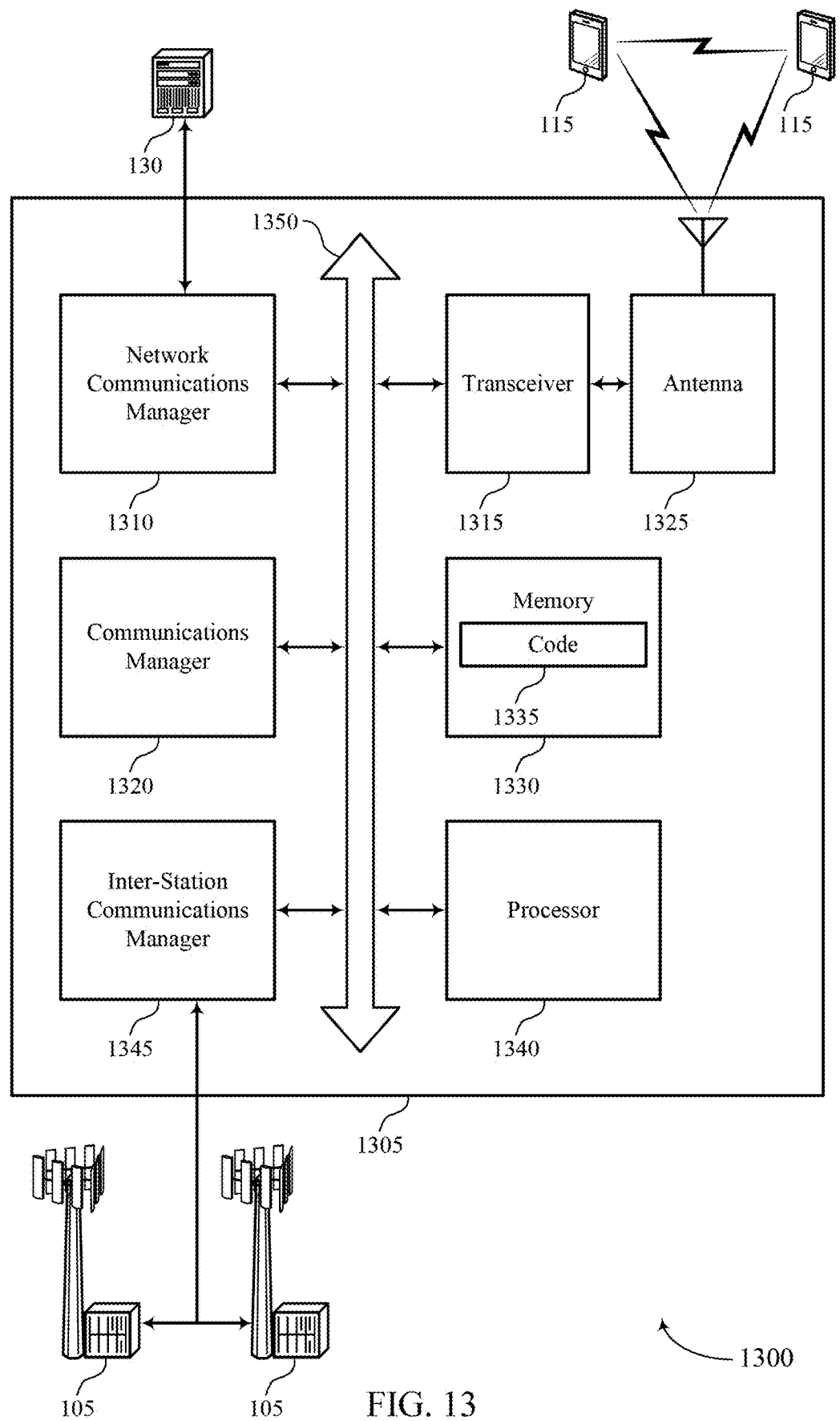
FIG. 13 shows a diagram of a system including a device that supports techniques for haptics communication in accordance with aspects of the present disclosure.

FIG. 13 shows a diagram of a system 1300 including a device 1305 that supports techniques for haptics communication in accordance with aspects of the present disclosure. The device 1305 may be an example of or include the components of a device 1005, a device 1105, or a base station 105 as described herein. The device 1305 may communicate wirelessly with one or more base stations 105, UEs 115, or any combination thereof. The device 1305 may include components for bi-directional voice and data communications including components for transmitting and receiving communications, such as a communications manager 1320, a network communications manager 1310, a transceiver 1315, an antenna 1325, a memory 1330, code 1335, a processor 1340, and an inter-station communications manager 1345. These components may be in electronic communication or otherwise coupled (e.g., operatively, communicatively, functionally, electronically, electrically) via one or more buses (e.g., a bus 1350).

The network communications manager 1310 may manage communications with a core network 130 (e.g., via one or more wired backhaul links). For example, the network communications manager 1310 may manage the transfer of data communications for client devices, such as one or more UEs 115.

In some cases, the device 1305 may include a single antenna 1325. However, in some other cases the device 1305 may have more than one antenna 1325, which may be capable of concurrently transmitting or receiving multiple wireless transmissions. The transceiver 1315 may communicate bi-directionally, via the one or more antennas 1325, wired, or wireless links as described herein. For example, the transceiver 1315 may represent a wireless transceiver and may communicate bi-directionally with another wireless transceiver. The transceiver 1315 may also include a modem to modulate the packets, to provide the modulated packets to one or more antennas 1325 for transmission, and to demodulate packets received from the one or more antennas 1325. The transceiver 1315, or the transceiver 1315 and one or more antennas 1325, may be an example of a transmitter 1015, a transmitter 1115, a receiver 1010, a receiver 1110, or any combination thereof or component thereof, as described herein.

The memory 1330 may include RAM and ROM. The memory 1330 may store computer-readable, computer-executable code 1335 including instructions that, when executed by the processor 1340, cause the device 1305 to perform various functions described herein. The code 1335 may be stored in a non-transitory computer-readable medium such as system memory or another type of memory. In some cases, the code 1335 may not be directly executable by the processor 1340 but may cause a computer (e.g., when compiled and executed) to perform functions described herein. In some cases, the memory 1330 may contain, among other things, a BIOS which may control basic hardware or software operation such as the interaction with peripheral components or devices.

The processor 1340 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1340 may be configured to operate a memory array using a memory controller. In some other cases, a memory controller may be integrated into the processor 1340. The processor 1340 may be configured to execute computer-readable instructions stored in a memory (e.g, the memory 1330) to cause the device 1305 to perform various functions (e.g., functions or tasks supporting techniques for haptics communication). For example, the device 1305 or a component of the device 1305 may include a processor 1340 and memory 1330 coupled to the processor 1340, the processor 1340 and memory 1330 configured to perform various functions described herein.

The inter-station communications manager 1345 may manage communications with other base stations 105, and may include a controller or scheduler for controlling communications with UEs 115 in cooperation with other base stations 105. For example, the inter-station communications manager 1345 may coordinate scheduling for transmissions to UEs 115 for various interference mitigation techniques such as beamforming or joint transmission. In some examples, the inter-station communications manager 1345 may provide an X2 interface within an LTE/LTE-A wireless communications network technology to provide communication between base stations 105.

The communications manager 1320 may support communication by a server in accordance with examples as disclosed herein. For example, the communications manager 1320 may be configured as or otherwise support a means for receiving, from a set of multiple first devices associated with a set of multiple transmitting entities, a set of multiple digital messages, where each of the set of multiple digital messages includes sentiment information to be communicated to a second device associated with a receiving entity. The communications manager 1320 may be configured as or otherwise support a means for determining, for each of the set of multiple digital messages, a first haptic information corresponding to a transmitting entity of the set of multiple transmitting entities and second haptic information corresponding to the sentiment information. The communications manager 1320 may be configured as or otherwise support a means for identifying a pattern associated with aggregated sentiment information from the set of multiple digital messages. The communications manager 1320 may be configured as or otherwise support a means for formatting a second digital message for transmission to the second device to include third haptic information corresponding to the aggregated sentiment information. The communications manager 1320 may be configured as or otherwise support a means for transmitting the second digital message to the second device associated with the receiving entity.

By including or configuring the communications manager 1320 in accordance with examples as described herein, the device 1305 may support techniques for haptics communication described herein.

In some examples, the communications manager 1320 may be configured to perform various operations (e.g., receiving, monitoring, transmitting) using or otherwise in cooperation with the transceiver 1315, the one or more antennas 1325, or any combination thereof. Although the communications manager 1320 is illustrated as a separate component, in some examples, one or more functions described with reference to the communications manager 1320 may be supported by or performed by the processor 1340, the memory 1330, the code 1335, or any combination thereof. For example, the code 1335 may include instructions executable by the processor 1340 to cause the device 1305 to perform various aspects of techniques for haptics communication as described herein, or the processor 1340 and the memory 1330 may be otherwise configured to perform or support such operations.

Figure 14:
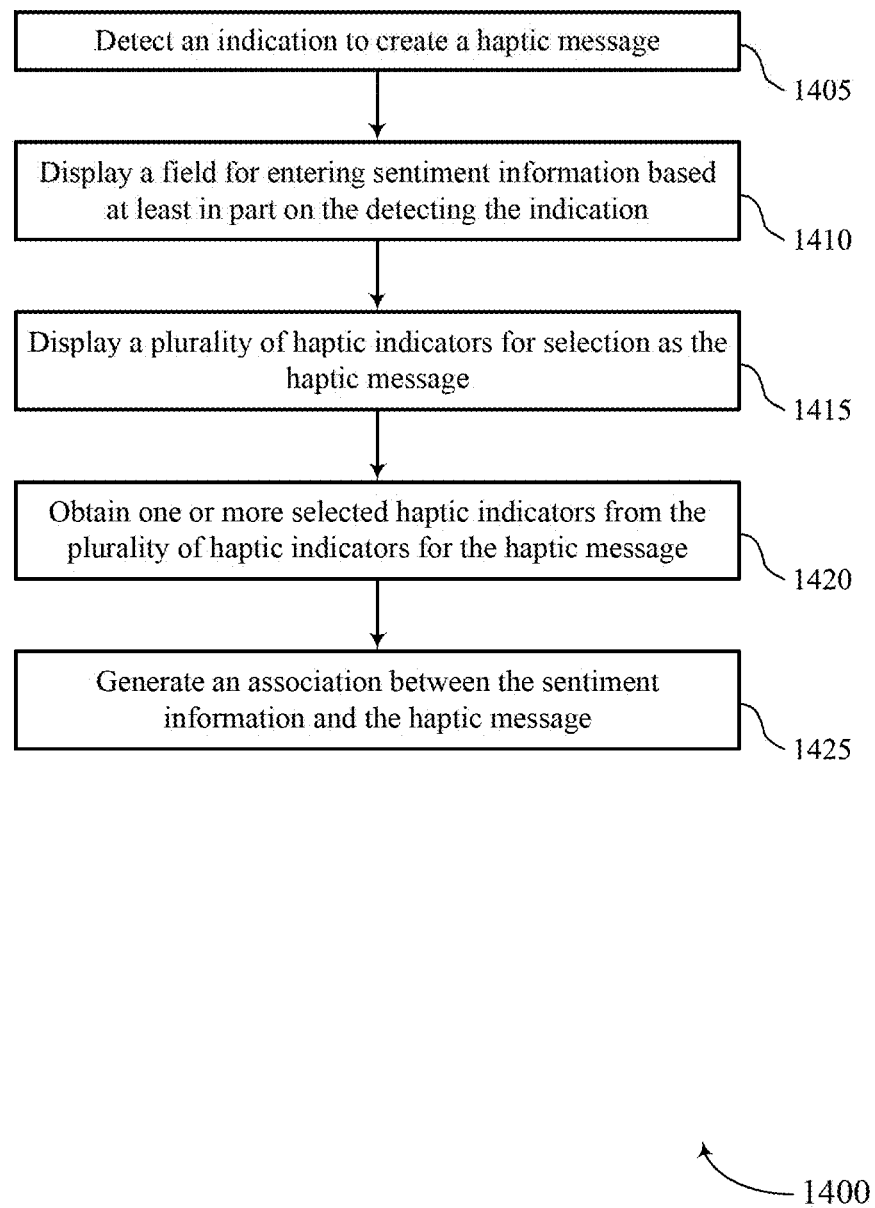
FIGS. 14 through 18 show flowcharts illustrating methods that support techniques for haptics communication in accordance with aspects of the present disclosure.

FIG. 14 shows a flowchart illustrating a method 1400 that supports techniques for haptics communication in accordance with aspects of the present disclosure. The operations of the method 1400 may be implemented by a UE or its components as described herein. For example, the operations of the method 1400 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1405, the method may include detecting an indication to create a haptic message. The operations of 1405 may be performed in accordance with examples as disclosed herein. In some examples, aspects of the operations of 1405 may be performed by a haptics communication manager 825 as described with reference to FIG. 8.

At 1410, the method may include displaying a field for entering sentiment information based on the detecting the indication. The operations of 1410 may be performed in accordance with examples as disclosed herein. In some examples, aspects of the operations of 1410 may be performed by a haptics sentiment manager 830 as described with reference to FIG. 8.

At 1415, the method may include displaying a set of multiple haptic indicators for selection. In some embodiments, method may include displaying a set of multiple timing indicators for selection. The sets of multiple haptic and timing indicators may be associated with the sentiment information. The operations of 1415 may be performed in accordance with examples as disclosed herein. In some examples, aspects of the operations of 1415 may be performed by a haptics communication manager 825 as described with reference to FIG. 8.

At 1420, the method may include obtaining one or more selected haptic indicators from the set of multiple haptic indicators. In some embodiments, the method may include obtaining one or more selected timing indicators from the set of multiple timing indicators. The operations of 1420 may be performed in accordance with examples as disclosed herein. In some examples, aspects of the operations of 1420 may be performed by a haptics communication manager 825 as described with reference to FIG. 8.

At 1425, the method may include generating the haptic message as an association between the sentiment information and the one or more selected haptic indicators. In some embodiments, the method may include generating haptic message as an association between the sentiment information and one or more selected timing indicators, or between any combination of the one or more selected timing and haptic indicators. The operations of 1425 may be performed in accordance with examples as disclosed herein. In some examples, aspects of the operations of 1425 may be performed by a haptics sentiment manager 830 as described with reference to FIG. 8.

Figure 15:
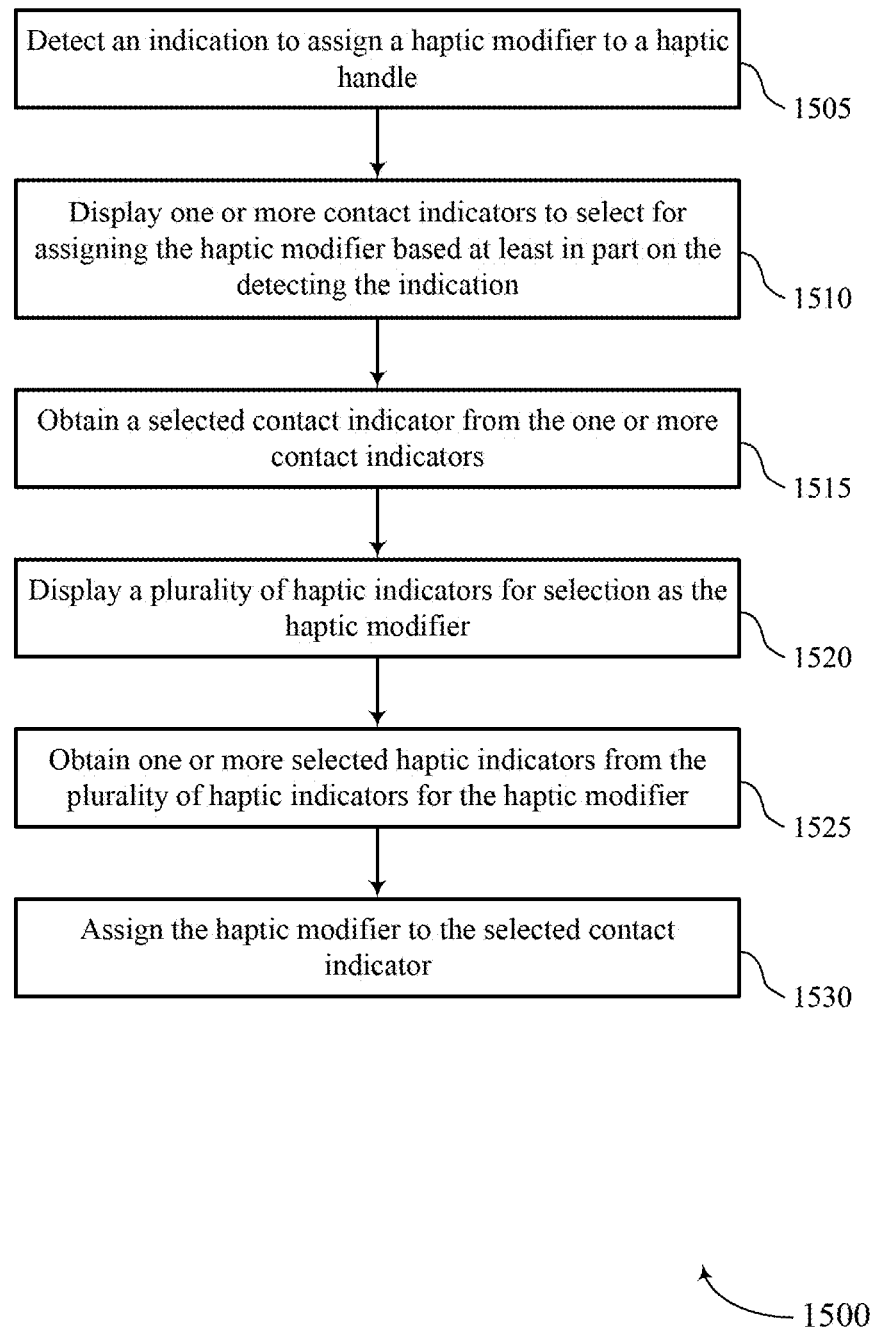

FIG. 15 shows a flowchart illustrating a method 1500 that supports techniques for haptics communication in accordance with aspects of the present disclosure. The operations of the method 1500 may be implemented by a UE or its components as described herein. For example, the operations of the method 1500 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1505, the method may include detecting an indication to assign a haptic modifier to a haptic handle. The operations of 1505 may be performed in accordance with examples as disclosed herein. In some examples, aspects of the operations of 1505 may be performed by a haptics communication manager 825 as described with reference to FIG. 8.

At 1510, the method may include displaying one or more recipient indicators to select for assigning the haptic modifier based on the detecting the indication. The operations of 1510 may be performed in accordance with examples as disclosed herein. In some examples, aspects of the operations of 1510 may be performed by a haptics handle manager 835 as described with reference to FIG. 8.

At 1515, the method may include obtaining a selected recipient indicator from the one or more recipient indicators. The operations of 1515 may be performed in accordance with examples as disclosed herein. In some examples, aspects of the operations of 1515 may be performed by a haptics handle manager 835 as described with reference to FIG. 8.

At 1520, the method may include displaying a set of multiple haptic indicators for selection as the haptic modifier. The operations of 1520 may be performed in accordance with examples as disclosed herein. In some examples, aspects of the operations of 1520 may be performed by a haptics handle manager 835 as described with reference to FIG. 8.

At 1525, the method may include obtaining one or more selected haptic indicators from the set of multiple haptic indicators for the haptic modifier. The operations of 1525 may be performed in accordance with examples as disclosed herein. In some examples, aspects of the operations of 1525 may be performed by a haptics handle manager 835 as described with reference to FIG. 8.

At 1530, the method may include assigning the haptic modifier to the selected recipient indicator. The operations of 1530 may be performed in accordance with examples as disclosed herein. In some examples, aspects of the operations of 1530 may be performed by a haptics communication manager 825 as described with reference to FIG. 8.

Figure 16:
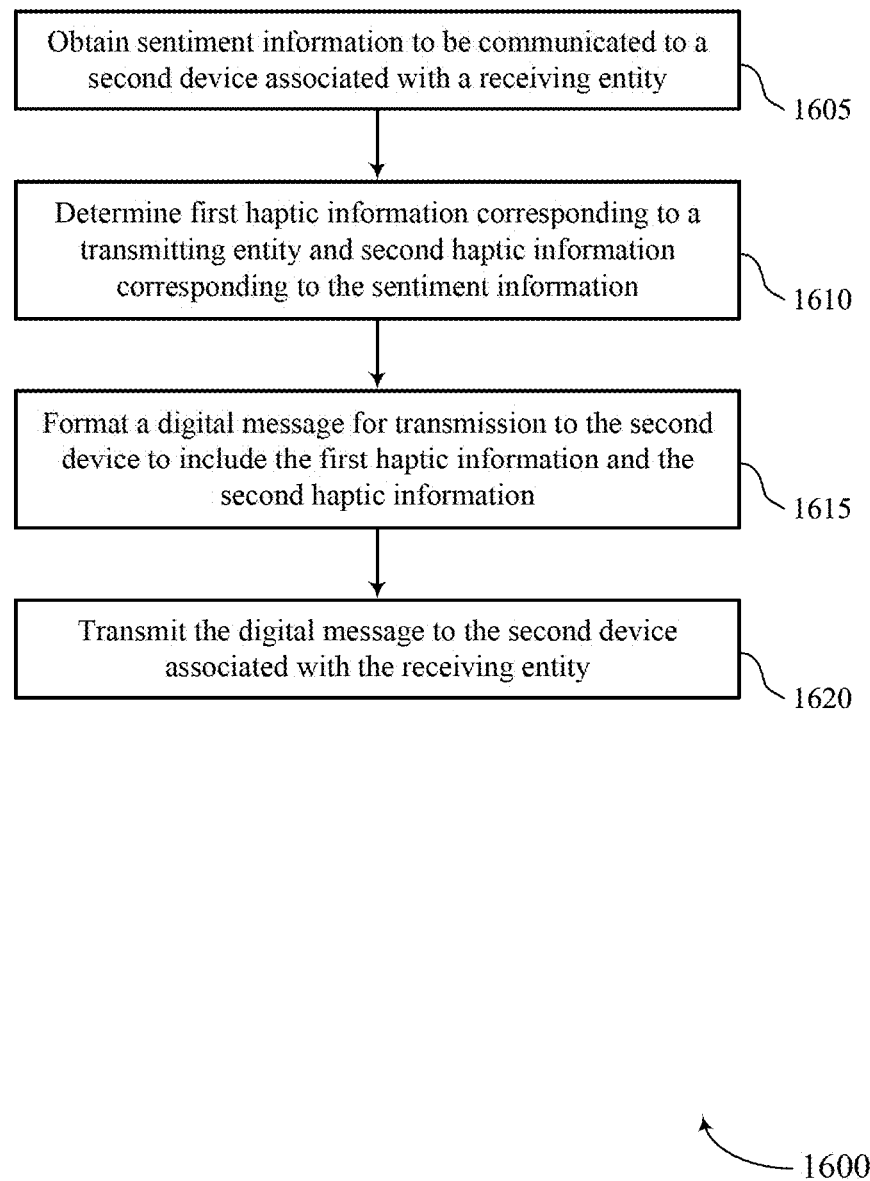

FIG. 16 shows a flowchart illustrating a method 1600 that supports techniques for haptics communication in accordance with aspects of the present disclosure. The operations of the method 1600 may be implemented by a UE or its components as described herein. For example, the operations of the method 1600 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1605, the method may include obtaining sentiment information to be communicated to a second device associated with a receiving entity. The operations of 1605 may be performed in accordance with examples as disclosed herein. In some examples, aspects of the operations of 1605 may be performed by a haptics sentiment manager 830 as described with reference to FIG. 8.

At 1610, the method may include determining first haptic information corresponding to a transmitting entity and second haptic information corresponding to the sentiment information. The operations of 1610 may be performed in accordance with examples as disclosed herein. In some examples, aspects of the operations of 1610 may be performed by a haptics communication manager 825 as described with reference to FIG. 8.

At 1615, the method may include formatting a digital message for transmission to the second device to include the first haptic information and the second haptic information. The operations of 1615 may be performed in accordance with examples as disclosed herein. In some examples, aspects of the operations of 1615 may be performed by a haptics communication manager 825 as described with reference to FIG. 8.

At 1620, the method may include transmitting the digital message to the second device associated with the receiving entity. The operations of 1620 may be performed in accordance with examples as disclosed herein. In some examples, aspects of the operations of 1620 may be performed by a haptics communication manager 825 as described with reference to FIG. 8.

Figure 17:
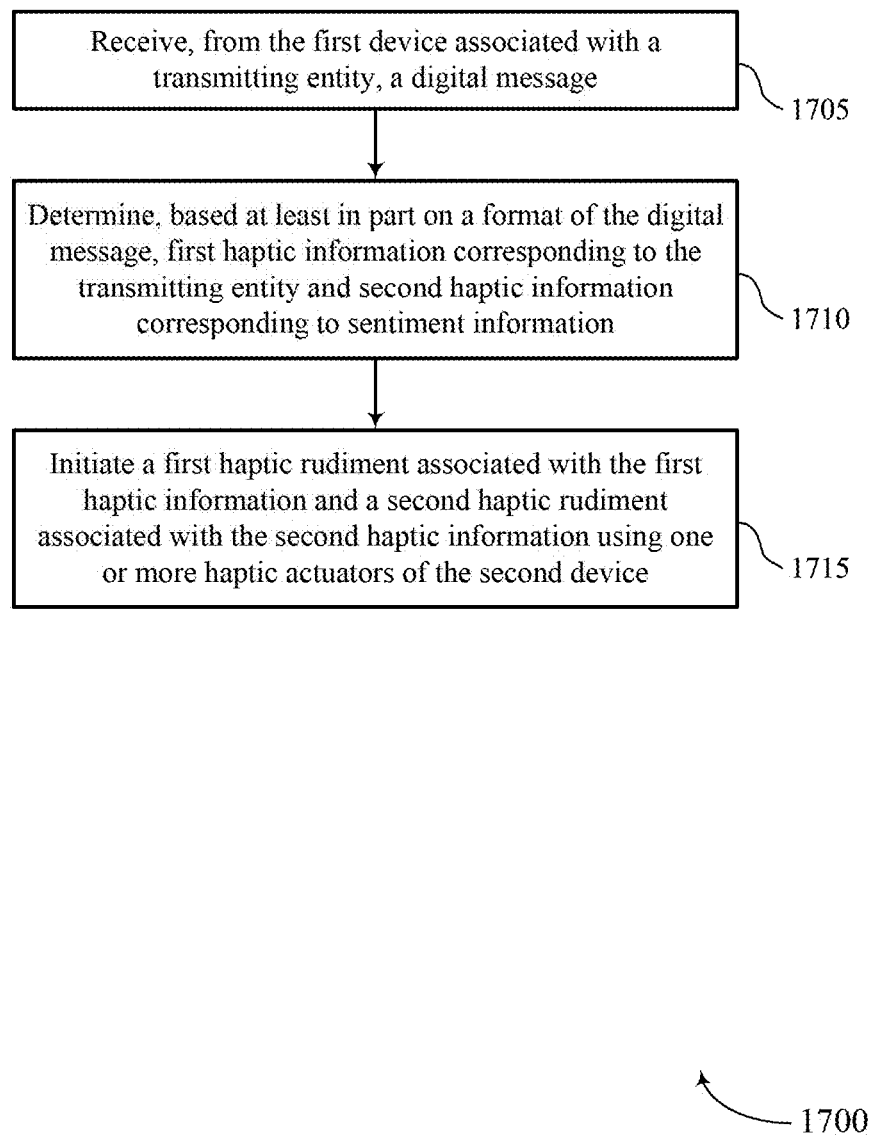

FIG. 17 shows a flowchart illustrating a method 1700 that supports techniques for haptics communication in accordance with aspects of the present disclosure. The operations of the method 1700 may be implemented by a UE or its components as described herein. For example, the operations of the method 1700 may be performed by a UE 115 as described with reference to FIGS. 1 through 9. In some examples, a UE may execute a set of instructions to control the functional elements of the UE to perform the described functions. Additionally or alternatively, the UE may perform aspects of the described functions using special-purpose hardware.

At 1705, the method may include receiving, from the first device associated with a transmitting entity, a digital message. The operations of 1705 may be performed in accordance with examples as disclosed herein. In some examples, aspects of the operations of 1705 may be performed by a haptics communication manager 825 as described with reference to FIG. 8.

At 1710, the method may include determining, based on a format of the digital message, first haptic information corresponding to the transmitting entity and second haptic information corresponding to sentiment information. The operations of 1710 may be performed in accordance with examples as disclosed herein. In some examples, aspects of the operations of 1710 may be performed by a haptics communication manager 825 as described with reference to FIG. 8.

At 1715, the method may include initiating a first haptic rudiment associated with the first haptic information and a second haptic rudiment associated with the second haptic information using one or more haptic actuators of the second device. The operations of 1715 may be performed in accordance with examples as disclosed herein. In some examples, aspects of the operations of 1715 may be performed by a haptics communication manager 825 as described with reference to FIG. 8.

Figure 18:
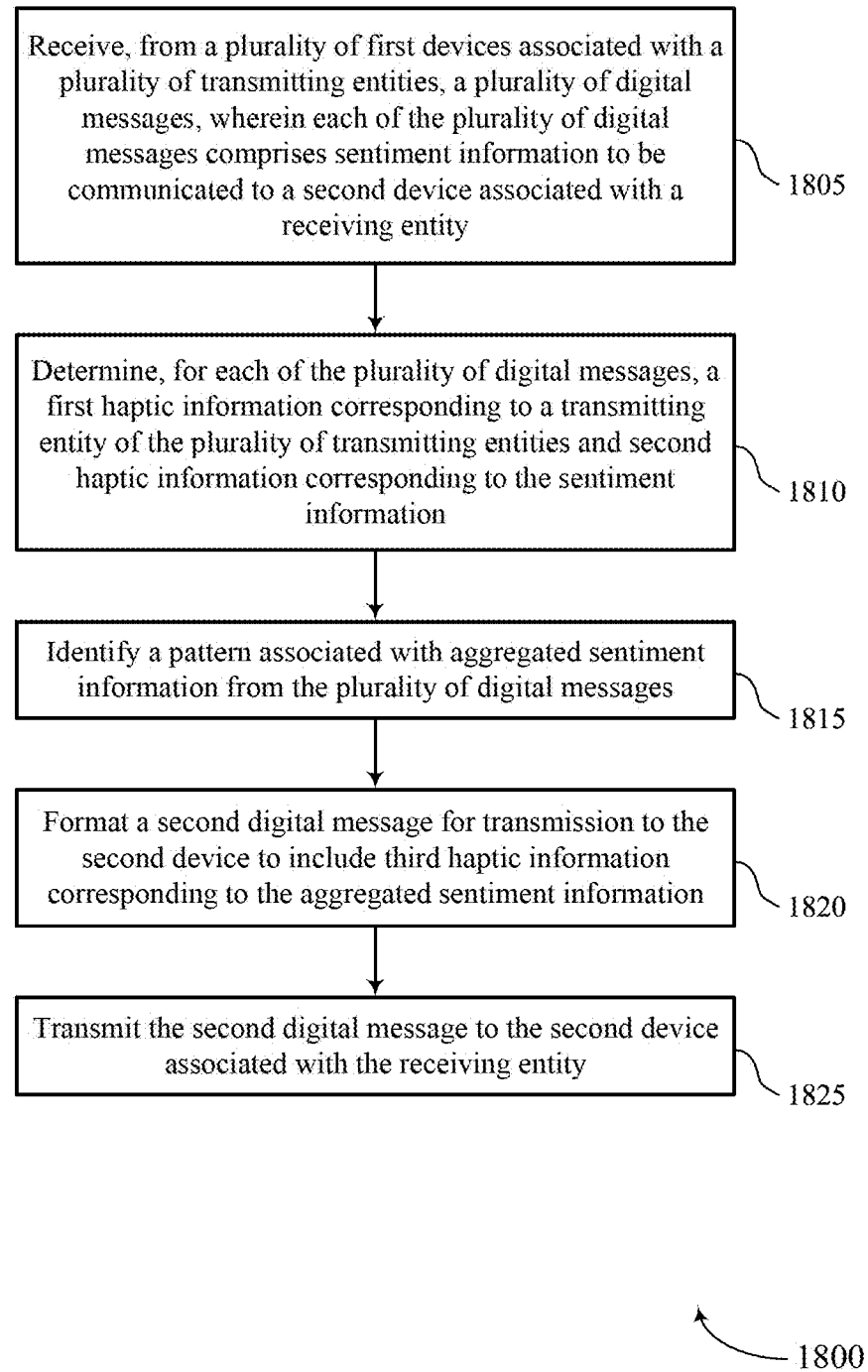

FIG. 18 shows a flowchart illustrating a method 1800 that supports techniques for haptics communication in accordance with aspects of the present disclosure. The operations of the method 1800 may be implemented by a base station or its components as described herein. For example, the operations of the method 1800 may be performed by a base station 105 as described with reference to FIGS. 1 through 5 and 10 through 13. In some examples, a base station may execute a set of instructions to control the functional elements of the base station to perform the described functions. Additionally or alternatively, the base station may perform aspects of the described functions using special-purpose hardware.

At 1805, the method may include receiving, from a set of multiple first devices associated with a set of multiple transmitting entities, a set of multiple digital messages, where each of the set of multiple digital messages includes sentiment information to be communicated to a second device associated with a receiving entity. The operations of 1805 may be performed in accordance with examples as disclosed herein. In some examples, aspects of the operations of 1805 may be performed by a haptics communication manager 1225 as described with reference to FIG. 12.

At 1810, the method may include determining, for each of the set of multiple digital messages, a first haptic information corresponding to a transmitting entity of the set of multiple transmitting entities and second haptic information corresponding to the sentiment information. The operations of 1810 may be performed in accordance with examples as disclosed herein. In some examples, aspects of the operations of 1810 may be performed by a haptics communication manager 1225 as described with reference to FIG. 12.

At 1815, the method may include identifying a pattern associated with aggregated sentiment information from the set of multiple digital messages. The operations of 1815 may be performed in accordance with examples as disclosed herein. In some examples, aspects of the operations of 1815 may be performed by a haptics aggregation manager 1230 as described with reference to FIG. 12.

At 1820, the method may include formatting a second digital message for transmission to the second device to include third haptic information corresponding to the aggregated sentiment information. The operations of 1820 may be performed in accordance with examples as disclosed herein. In some examples, aspects of the operations of 1820 may be performed by a haptics communication manager 1225 as described with reference to FIG. 12.

At 1825, the method may include transmitting the second digital message to the second device associated with the receiving entity. The operations of 1825 may be performed in accordance with examples as disclosed herein. In some examples, aspects of the operations of 1825 may be performed by a haptics communication manager 1225 as described with reference to FIG. 12.

Figure 19:
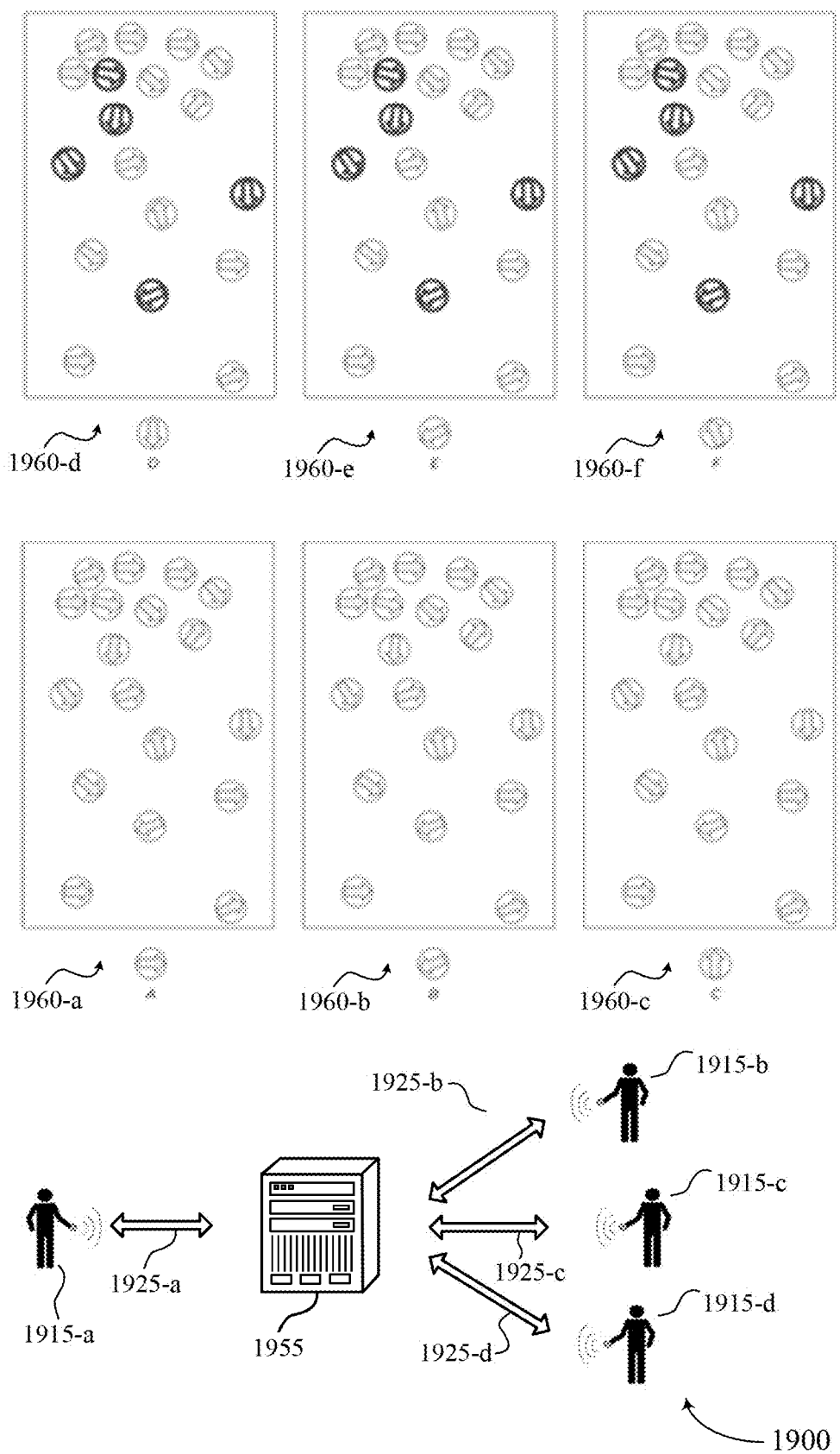
FIG. 19 illustrates an overview and examples of inverse broadcast that apply techniques for haptics communication in accordance with aspects of the present disclosure.

FIG. 19 illustrates the overview of the inverse broadcast 1900 that apply techniques for haptics communication in accordance with aspects of the present disclosure. The inverse broadcast aggregation algorithm utilizes a multiplicity of devices at 1915-*b*, 1915-*c*, and 1915-*d* capable of sensing and displaying vibration, temperature, thermal conductivity, hand and finger pose, orientation, direction, tactile sensations, i.e., any physical sensation perceptible by the human somatosensory system, and after transmission at 1925-*b*, 1925-*c* and 1925-*d* respectively, at 1955 mathematically calculates the sum, average, maximum/minimum, median, or any other statistical characteristic, spectral and/or frequency characteristics, compression, encryption, or i.e., any mathematical calculation based the multiplicity of devices' capabilities, as well as using or deriving meta information from those devices such as location, proximity, state, condition, users' demographics, user's membership in an enumerated group, etc., with any combination or permutation of the above, to produce and transmit at 1925-*a* a singular wring or series of vrings for a single user at 1915-*a* with a similarly capable device.

Take for example a device capable of displaying directional information with a physical sensation—say perhaps with the ability to point the fingers (hand pose), and orient the hand, i.e., a pointing device. Imagine a single user in need of directions to a particular location who has queried a multiplicity of users with such a pointing device. In this case, the aggregating algorithm could at 1960-*a* average the multiplicity of users' pointing and display that direction to the singe user, or at 1960-*b* select the furthest outlier (extrema) and display that direction to the single user, or at 1960-*c* ignore the individual pointing from the multiplicity of users and instead display the direction of the highest density of other users to the single user.

Furthermore, the aggregation algorithm could at 1960-*d* calculate a resultant direction as the average of only a subset of the multiplicity of users based on membership to some group (illustrated in bold), or at 1960-*e* calculate the extrema of the selected group, or finally at 1960-*f* as above, ignore the pointing of the subset group and instead point to the direction of highest density of the subset of users.

Another example of an inverse broadcast might follow a performer who is wearing a device capable of vibration display and whose audience members are holding devices capable of measuring the squeeze strength. During a performance, the inverse broadcast algorithm could average the squeezing strength of audience members, and together with their respective locations, display a higher vibration intensity pattern to the performer as he or she moves from one part of the stage to another. The resulting physical sensation that is aggregated, which does not have to be identical to any originating sensation, is then displayed to the single recipient user.

Another example of inverse broadcast might be in an election environment where voters are employing a device capable of sensing the "thumbs up" or "thumbs-down" hand pose, and the aggregating algorithm calculates the majority, or plurality of "up" or "down" states, and then displays the result to a singular user.

Another example of inverse broadcast is when a multiplicity of users are on a dance floor wearing devices capable of sensing body movements, and the aggregation algorithm compresses all movements in real-time and displays the result as pressure sensations to a single user who, for example, can't hear the music but wants to participate.

Additional examples of inverse broadcast include: virtual 'Marco Polo,' live polling feedback for participant in a debate, a pedestrian traffic aggregator—physically displaying crowd flow in the form of pressure to a user at a convention, concert venue, or on the streets of Tokyo, as a sales mechanism where multiple customers at a given vendor are sending 'good taco vibes' to a recipient who can then locate the vendor, as an indication of amusement park line lengths, or airport security line lengths, feel the "vibe" of a venue before or while waiting in line, wherein all of the examples the user receives the aggregated information without having to look at or hear anything.

The following provides a non-limiting overview of aspects of the present disclosure:

Aspect 1: A method by a device, comprising: detecting an indication to create a haptic message; displaying a field for entering sentiment information based at least in part on the detecting the indication; displaying a plurality of indicators (e.g., haptic indicators, timing indicators, etc.) for selection as the haptic message; obtaining one or more selected indicators from the plurality of indicators; generating a haptic message as an association between the sentiment information and the one or more selected indicators.

Aspect 2: The method of aspect 1, further comprising: obtaining, via the field, textual information corresponding to the sentiment information.

Aspect 3: The method of any of aspects 1 through 2, further comprising: obtaining, via the field, an image corresponding to the sentiment information.

Aspect 4: The method of any of aspects 1 through 3, wherein the one or more selected indicators comprises at least one of a haptic rudiment or a configured haptic message.

Aspect 5: The method of aspect 4, wherein the haptic rudiment is associated with a vibrating pattern caused by a haptic actuator.

Aspect 6: The method of any of aspects 4 through 5, wherein the haptic rudiment is associated with a stiffness or force caused by a haptic actuator.

Aspect 7: The method of any of aspects 4 through 6, wherein the haptic rudiment is associated with a thermal conductivity change caused by an actuator or heat-generating assembly.

Aspect 8: The method of any of aspects 1 through 7, wherein the obtaining the one or more selected indicators comprises: obtaining a first haptic indicator and a second haptic indicator from the plurality of haptic indicators.

Aspect 9: The method of aspect 8, further comprising: obtaining an indication that a first haptic rudiment associated with the first haptic indicator is to be initiated first in time and a second haptic rudiment associated with the second haptic indicator is to be initiated second in time.

Aspect 10: The method of any of aspects 8 through 9, further comprising: obtaining an indication that a first haptic rudiment associated with the first haptic indicator and a second haptic rudiment associated with the second haptic indicator are to be initiated concurrently.

Aspect 11: The method of any of aspects 1 through 10, wherein the obtaining the one or more selected haptic indicators comprises: obtaining a number of haptic indicators based at least in part on a haptic limitation associated with the device.

Aspect 12: The method of any of aspects 1 through 11, further comprising: displaying the haptic message for selecting to send to one or more contact indicators.

Aspect 13: A method by a device, comprising: detecting an indication to assign a haptic modifier to a haptic handle; displaying one or more contact indicators to select for assigning the haptic modifier based at least in part on the detecting the indication; obtaining a selected contact indicator from the one or more contact indicators; displaying a plurality of haptic indicators for selection as the haptic modifier; obtaining one or more selected haptic indicators from the plurality of haptic indicators for the haptic modifier; and assigning the haptic modifier to the selected contact indicator.

Aspect 14: The method of aspect 13, wherein the haptic modifier is a haptic suffix appended to the haptic handle of the selected contact indicator.

Aspect 15: The method of any of aspects 13 through 14, further comprising: displaying an indication of the haptic modifier with an image associated with the selected contact indicator.

Aspect 16: A method for communication by a first device, comprising: obtaining sentiment information to be communicated to a second device associated with a receiving entity; determining first haptic information corresponding to a transmitting entity and second haptic information corresponding to the sentiment information; formatting a digital message for transmission to the second device to include the first haptic information and the second haptic information; and transmitting the digital message to the second device associated with the receiving entity.

Aspect 17: The method of aspect 16, wherein the first haptic information corresponds to a haptic handle associated with the transmitting entity.

Aspect 18: The method of any of aspects 16 through 17, wherein the second haptic information corresponds to a haptic message created by the transmitting entity.

Aspect 19: The method of any of aspects 16 through 18, wherein the formatting the digital message for transmission comprises: formatting the digital message for transmission to the second device to include the first haptic information in a first field and the second haptic information in a second field different from the first field.

Aspect 20: The method of any of aspects 16 through 19, further comprising: formatting the digital message for transmission to the second device to include metadata corresponding to at least one of the sentiment information, the first device, or the second device.

Aspect 21: The method of any of aspects 16 through 20, further comprising: obtaining a trigger indication for the transmitting the digital message to the second device.

Aspect 22: The method of aspect 21, wherein the transmitting the digital message to the second device comprises: transmitting the digital message to the second device based at least in part on satisfying a trigger corresponding to the trigger indication.

Aspect 23: The method of any of aspects 16 through 22, further comprising: detecting, based at least on a sensor associated with the first device, a trigger for transmitting the digital message to the second device.

Aspect 24: The method of any of aspects 16 through 23, further comprising: obtaining a conditional indication associated with the digital message; and formatting the digital message for transmission to the second device to include metadata corresponding to the conditional indication.

Aspect 25: The method of aspect 24, wherein the conditional indication comprises at least one of an activity status associated with the second device, a location attribute associated with the second device, or a power status associated with the second device.

Aspect 26: A method for communication by a second device different from a first device, comprising: receiving, from the first device associated with a transmitting entity, a digital message; determining, based at least in part on a format of the digital message, first haptic information corresponding to the transmitting entity and second haptic information corresponding to sentiment information; and initiating a first haptic rudiment associated with the first haptic information and a second haptic rudiment associated with the second haptic information using one or more haptic actuators of the second device.

Aspect 27: The method of aspect 26, wherein the first haptic information corresponds to a haptic handle associated with the transmitting entity.

Aspect 28: The method of any of aspects 26 through 27, wherein the second haptic information corresponds to a haptic message created by the transmitting entity.

Aspect 29: The method of any of aspects 26 through 28, wherein the initiating further comprises: initiating the first haptic rudiment associated with the first haptic information at a first time and the second haptic rudiment associated with the second haptic information at a second time.

Aspect 30: The method of any of aspects 26 through 29, wherein the initiating further comprises: initiating the first haptic rudiment associated with the first haptic information and the second haptic rudiment associated with the second haptic information concurrently.

Aspect 31: The method of any of aspects 26 through 30, wherein the determining further comprises: determining, based at least in part on the format of the digital message, third haptic information corresponding to second sentiment information different from the sentiment information.

Aspect 32: The method of aspect 31, wherein the initiating further comprises: initiating the second haptic rudiment associated with the second haptic information and a third haptic rudiment associated with the third haptic information concurrently.

Aspect 33: A method for communication by a server, comprising: receiving, from a plurality of first devices associated with a plurality of transmitting entities, a plurality of digital messages, wherein each of the plurality of digital messages comprises sentiment information to be communicated to a second device associated with a receiving entity; determining, for each of the plurality of digital messages, a first haptic information corresponding to a transmitting entity of the plurality of transmitting entities and second haptic information corresponding to the sentiment information; identifying a pattern associated with aggregated sentiment information from the plurality of digital messages; formatting a second digital message for transmission to the second device to include third haptic information corresponding to the aggregated sentiment information; and transmitting the second digital message to the second device associated with the receiving entity.

Aspect 34: The method of aspect 33, further comprising: performing an aggregation algorithm corresponding one or more characteristics of the plurality of digital messages.

Aspect 35: The method of aspect 34, wherein the identifying the pattern further comprises: identifying the pattern associated with aggregated sentiment information based at least in part on corresponding second haptic information from the plurality of digital messages.

Aspect 36: The method of any of aspects 34 through 35, wherein the identifying the pattern further comprises: identifying the pattern associated with aggregated sentiment information based at least in part on corresponding metadata from the plurality of digital messages.

Aspect 37: An apparatus comprising a processor; memory coupled with the processor; and instructions stored in the memory and executable by the processor to cause the apparatus to perform a method of any of aspects 1 through 12.

Aspect 38: An apparatus comprising at least one means for performing a method of any of aspects 1 through 12.

Aspect 39: A non-transitory computer-readable medium storing code the code comprising instructions executable by a processor to perform a method of any of aspects 1 through 12.

Aspect 40: An apparatus comprising a processor; memory coupled with the processor; and instructions stored in the memory and executable by the processor to cause the apparatus to perform a method of any of aspects 13 through 15.

Aspect 41: An apparatus comprising at least one means for performing a method of any of aspects 13 through 15.

Aspect 42: A non-transitory computer-readable medium storing code the code comprising instructions executable by a processor to perform a method of any of aspects 13 through 15.

Aspect 43: An apparatus for communication by a first device, comprising a processor; memory coupled with the processor; and instructions stored in the memory and executable by the processor to cause the apparatus to perform a method of any of aspects 16 through 25.

Aspect 44: An apparatus for communication by a first device, comprising at least one means for performing a method of any of aspects 16 through 25.

Aspect 45: A non-transitory computer-readable medium storing code for communication by a first device, the code comprising instructions executable by a processor to perform a method of any of aspects 16 through 25.

Aspect 46: An apparatus for communication by a second device different from a first device, comprising a processor; memory coupled with the processor; and instructions stored in the memory and executable by the processor to cause the apparatus to perform a method of any of aspects 26 through 32.

Aspect 47: An apparatus for communication by a second device different from a first device, comprising at least one means for performing a method of any of aspects 26 through 32.

Aspect 48: A non-transitory computer-readable medium storing code for communication by a second device different from a first device, the code comprising instructions executable by a processor to perform a method of any of aspects 26 through 32.

Aspect 49: An apparatus for communication by a server, comprising a processor; memory coupled with the processor; and instructions stored in the memory and executable by the processor to cause the apparatus to perform a method of any of aspects 33 through 36.

Aspect 50: An apparatus for communication by a server, comprising at least one means for performing a method of any of aspects 33 through 36.

Aspect 51: A non-transitory computer-readable medium storing code for communication by a server, the code comprising instructions executable by a processor to perform a method of any of aspects 33 through 36.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UM B), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e, A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
    detecting, at a first device associated with a transmitting entity, an indication to create a haptic message;
    displaying via the first device, a field for entering sentiment information based at least in part on the detecting the indication;
    displaying, via the first device, a plurality of haptic indicators for selection, the plurality of haptic indicators associated with the sentiment information;
    obtaining one or more selected haptic indicators from the plurality of haptic indicators;
    generating the haptic message as an association between the sentiment information and the one or more selected haptic indicators and wherein the haptic message comprises a haptic indication of the transmitting entity; and
    transmitting, to a second device associated with a receiving entity, the generated haptic message that is configured to haptically indicate, to the receiving entity via the second device, the one or more selected haptic indicators and the haptic indication of the transmitting entity.

2. The method of claim 1, further comprising:
    displaying a plurality of timing indicators for selection, the plurality of timing indicators associated with the sentiment information;
    obtaining one or more selected timing indicators from the plurality of timing indicators; and
    generating the haptic message as an association between the sentiment information and any combination of one or more selected timing and haptic indicators.

3. The method of claim 1, further comprising:
    obtaining, via the field, textual information corresponding to the sentiment information.

4. The method of claim 1, further comprising:
    obtaining, via the field, an image corresponding to the sentiment information.

5. The method of claim 1, wherein the one or more selected haptic indicators comprises at least one of a haptic rudiment or a configured haptic message.

6. The method of claim 1, further comprising:
    displaying the haptic message for selecting to send to one or more contact indicators.

7. A method for communication by a first device, comprising:
    obtaining sentiment information to be communicated to a second device associated with a receiving entity;
    determining first haptic information corresponding to a transmitting entity and second haptic information corresponding to the sentiment information;
    formatting a digital message for transmission to the second device to include the first haptic information and the second haptic information; and
    transmitting the digital message to the second device associated with the receiving entity, wherein the digital message is configured to haptically indicate, to the receiving entity via the second device, the first haptic information and the second haptic information.

8. The method of claim 7, wherein the first haptic information corresponds to a haptic handle associated with the transmitting entity.

9. The method of claim 7, wherein the second haptic information corresponds to a haptic message created by the transmitting entity.

10. The method of claim 7, wherein the formatting the digital message for transmission comprises:
formatting the digital message for transmission to the second device to include the first haptic information in a first field and the second haptic information in a second field different from the first field.

11. The method of claim 7, further comprising:
formatting the digital message for transmission to the second device to include metadata corresponding to at least one of the sentiment information, the first device, or the second device.

12. The method of claim 7, wherein the transmitting the digital message to the second device comprises:
transmitting the digital message to the second device based at least in part on satisfying a trigger corresponding to a trigger indication.

13. The method of claim 7, further comprising:
detecting, based at least on a sensor associated with the first device, a trigger for transmitting the digital message to the second device.

14. The method of claim 7, further comprising:
obtaining a conditional indication associated with the digital message; and
formatting the digital message for transmission to the second device to include metadata corresponding to the conditional indication.

15. The method of claim 14, wherein the conditional indication comprises at least one of an activity status associated with the second device, a location attribute associated with the second device, or a power status associated with the second device.

16. A method for communication by a server, comprising:
receiving, from a plurality of first devices associated with a plurality of transmitting entities, a plurality of digital messages, wherein each of the plurality of digital messages comprises sentiment information to be communicated to a second device associated with a receiving entity;
determining, for each of the plurality of digital messages, a first haptic information corresponding to a transmitting entity of the plurality of transmitting entities and second haptic information corresponding to the sentiment information;
identifying a pattern associated with aggregated sentiment information from the plurality of digital messages;
formatting a second digital message for transmission to the second device to include third haptic information corresponding to the aggregated sentiment information; and
transmitting the second digital message to the second device associated with the receiving entity, wherein the second digital message is configured to haptically indicate, to the receiving entity via the second device, the aggregated sentiment information.

17. The method of claim 16, further comprising:
performing an aggregation algorithm corresponding one or more characteristics of the plurality of digital messages.

18. The method of claim 17, wherein the identifying the pattern further comprises:
identifying the pattern associated with aggregated sentiment information based at least in part on corresponding second haptic information from the plurality of digital messages.

19. The method of claim 18, wherein the identifying the pattern further comprises:
identifying the pattern associated with aggregated sentiment information based at least in part on corresponding metadata from the plurality of digital messages.

20. The method of claim 1, wherein the haptic message is configured to haptically and concurrently indicate, to the receiving entity via the second device, the one or more selected haptic indicators and the haptic indication of the transmitting entity.

21. The method of claim 7, wherein the digital message is configured to haptically and concurrently indicate, to the receiving entity via the second device, the first haptic information and the second haptic information.

22. The method of claim 18, wherein each first device of the plurality of first devices is associate with a respective user and wherein each digital message of the plurality of digital messages is triggered by the respective user.

* * * * *